(12) United States Patent
Turek et al.

(10) Patent No.: US 11,061,650 B2
(45) Date of Patent: Jul. 13, 2021

(54) METHODS AND APPARATUS TO AUTOMATICALLY GENERATE CODE FOR GRAPHICAL USER INTERFACES

(71) Applicant: Intel Corporation, Santa Clara, CA (US)

(72) Inventors: Javier Sebastian Turek, Beaverton, OR (US); Javier Felip Leon, Hillsboro, OR (US); Luis Carlos Maria Remis, Hillsboro, OR (US); David Israel Gonzalez Aguirre, Hillsboro, OR (US); Ignacio Javier Alvarez, Portland, OR (US); Justin Gottschlich, Santa Clara, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/455,216

(22) Filed: Jun. 27, 2019

(65) Prior Publication Data

US 2019/0317739 A1    Oct. 17, 2019

(51) Int. Cl.
| | |
|---|---|
| *G06F 8/38* | (2018.01) |
| *G06F 8/10* | (2018.01) |
| *G06N 3/04* | (2006.01) |
| *G06T 7/168* | (2017.01) |
| *G06F 9/451* | (2018.01) |
| *G06N 5/04* | (2006.01) |

(52) U.S. Cl.
CPC ............... *G06F 8/38* (2013.01); *G06F 8/10* (2013.01); *G06N 3/0454* (2013.01); *G06T 7/168* (2017.01); *G06F 9/451* (2018.02); *G06N 5/04* (2013.01)

(58) Field of Classification Search
CPC ........ G06F 3/0482; G06F 9/451; G06F 89/38; G06F 8/38; G06F 8/10; G06N 5/04; G06N 3/0454; G05B 2219/32128; G06T 7/168
See application file for complete search history.

(56) References Cited

U.S. PATENT DOCUMENTS

| | | | |
|---|---|---|---|
| 2007/0130529 A1* | 6/2007 | Shrubsole | G06F 8/38 715/762 |
| 2019/0114302 A1* | 4/2019 | Bequet | G06N 3/0445 |

(Continued)

OTHER PUBLICATIONS

Ling et al., "Latent Predictor Networks for Code Generation", arXiv:1603.06744v2 [cs.CL] Jun. 8, 2016 (Year: 2016).*

(Continued)

*Primary Examiner* — Andrew L Tank
(74) *Attorney, Agent, or Firm* — Hanley, Flight & Zimmerman, LLC

(57) ABSTRACT

Methods and apparatus to automatically generate code for graphical user interfaces are disclosed. An example apparatus includes a textual description analyzer to encode a user-provided textual description of a GUI design using a first neural network. The example apparatus further includes a DSL statement generator to generate a DSL statement with a second neural network. The DSL statement is to define a visual element of the GUI design. The DSL statement is generated based on at least one of the encoded textual description or a user-provided image representative of the GUI design. The example apparatus further includes a rendering tool to render a mockup of the GUI design based on the DSL statement.

31 Claims, 9 Drawing Sheets

(56) References Cited

U.S. PATENT DOCUMENTS

| | | | |
|---|---|---|---|
| 2019/0250891 A1* | 8/2019 | Kumar | G06F 8/34 |
| 2019/0304156 A1* | 10/2019 | Amer | G06N 3/0454 |
| 2020/0097301 A1* | 3/2020 | Pasala | G06F 9/451 |

OTHER PUBLICATIONS

Beltramelli, "pix2code: Generating Code from a Graphical User Interface Screenshot", arXiv:1705.07962v2 [cs.LG] Sep. 19, 2017 (Year: 2017).*

Yun et al., "Detection of GUI Elements on Sketch Images Using Object Detector Based on Deep Neural Networks", Copyright Springer Nature Singapore Pte Ltd. 2019, S. O. Hwang et al. (Eds.): ICGHIT 2018, LNEE 502, pp. 86-90, 2019 (Year: 2019).*

Framer, "Framer X," available at https://www.framer.com, retrieved on Jun. 24, 2019, 9 pages.

Sketchapp, "Sketch," available at https://www.sketchapp.com/, retrieved on Jun. 24, 2019, 13 pages.

Adobe, "Adobe XD," available at https://www.adobe.com/uk/products/xd.html, retrieved on Jun. 24, 2019, 14 pages.

Qt, "Qt Design Studio," available at https://www.qt.io/ui-framework, retrieved on Jun. 24, 2019, 3 pages.

Adobe "Adobe Photoshop," available at https://www.adobe.com/products/photoshop.html, retrieved on Jun. 24, 2019, 10 pages.

Qt, "Qt," available at https://www.qt.io, retrieved on Jun. 26, 2019, 7 pages.

Tramer et al. "Stealing Machine Learning Models via Prediction APIs," in 25th UESNIX Security Symposium, 2016, 19 pages.

Oh et al. "Towards Reverse-Engineering Black-Box Neural Networks," in International Conference on Learning Representations (ICLR), 2018, 20 pages.

Elman, "Finding Structure in Time," Cognitive Science, vol. 14, No. 2, pp. 179-211, 1990, 33 pages.

Mernik et al. "When and How to Develop Domain-Specific Languages," ACM Comput. Surv., vol. 37, No. 4, pp. 316-344, 2005, 33 pages.

Chiu et al. "State-of-the-art Speech Recognition With Sequence-to-Sequence Models," in IEEE International Conference on Acoustics, Speech and Signal Processing (ICASSP), 2018, 5 pages.

Pennington et al. "GloVe: Global Vectors for Word Representation," in Empirical Methods in Natural Language Processing (EMNLP), 2014, 12 pages.

Mikolov et al. "Distributed Representations of Words and Phrases and their Compositionality," in Advances in Neural Information Processing Systems (NIPS), 2013, 9 pages.

Sutskever et al. "Sequence to Sequence Learning with Neural Networks," in Advances in Neural Information Processing Systems 27 (NIPS), 2014, 9 pages.

Krizhevsky et al. "ImageNet Classification with Deep Convolutional Neural Networks," in Advances in Neural Information Processing Systems 25 (NIPS), 2012, 9 pages.

Jaderberg et al. "Spatial Transformer Networks," in Advances in Neural Information Processing Systems 28, 2015, 9 pages.

Ellis et al. "Learning to Infer Graphics Programs from Hand-Drawn Images," in Advances in Neural Information Processing Systems 31, 2018, 10 pages.

Goodfellow et al. "Generative Adversarial Nets," in Advances in Neural Information Processing Systems 27 (NIPS), 2014, 9 pages.

Mirza et al. "Conditional Generative Adversarial Nets," 2014, available at http://arxiv.org/abs/1411.1784, retrieved on Jun. 24, 2019, 7 pages.

Chen et al. "InfoGAN: Interpretable Representation Learning by Information Maximizing Generative Adversarial Nets," in Advances in Neural Information Processing Systems 29 (NIPS), 2016. 2019, 9 pages.

W3C, "HTML 5.2," available at https://www.w3.org/TR/html/,Dec. 14, 2017, retrieved on Jun. 24, 2019, 25 pages.

W3C, "CSS Snapshot 2018," available at https://www.w3.org/TR/CSS/, Jan. 22, 2019, retrieved on Jun. 24, 2019, 58 pages.

ANTLR, "ANTLR," available at https://www.antlr.org/, retrieved on Jun. 24, 2019, 2 pages.

FlowMapp, "FlowMapp," available at https://flowmapp.com/, retrieved on Jun. 24, 2019, 7 pages.

OverFlow, "OverFlow," available at https://overflow.io/, retrieved on Jun. 24, 2019, 2 pages.

TensorFlow, "TensorFlow," available at https://www.tensorflow.org, retrieved on Jun. 24, 2019, 8 pages.

PyTouch, "PyTorch," available at https://pytorch.org, retrieved on Jun. 24, 2019, 3 pages.

OPENAI, "Attacking Machine Learning with Adversarial Examples," available at https://blog.openai.com/adversarial-example-research/, retrieved on Feb. 21, 2017, 8 pages.

Uchida et al., "Embedding Watermarks into Deep Neural Networks," in Proceedings of the 2017 ACM on International Conference on Multimedia Retrieval (ICMR '17), 2017, 10 pages.

* cited by examiner

METHODS AND APPARATUS TO AUTOMATICALLY GENERATE CODE FOR GRAPHICAL USER INTERFACES

FIELD OF THE DISCLOSURE

This disclosure relates generally to graphical user interfaces, and, more particularly, to methods and apparatus to automatically generate code for graphical user interfaces.

BACKGROUND

The design process for graphical user interfaces (GUIs) often involves multiple people at multiple different stages of the process. For example, graphic designers may begin the process by preparing various design options with drawings based on previously defined requirements. Once a particular design option is selected, designers and software developers translate the visual drawings into software and add functionality to the associated visual elements. This process can include multiple stages of development including wireframes, mockups, and prototypes before a final functioning version of the GUI is created. Often, the GUI is provided to users to facilitate feedback on its usability and appeal. In many situations, the process involves multiple iterations over time until the GUI and its underlying code converge to a final version.

BRIEF DESCRIPTION OF THE DRAWINGS

In general, the same reference numbers will be used throughout the drawing(s) and accompanying written description to refer to the same or like parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Figure 1:
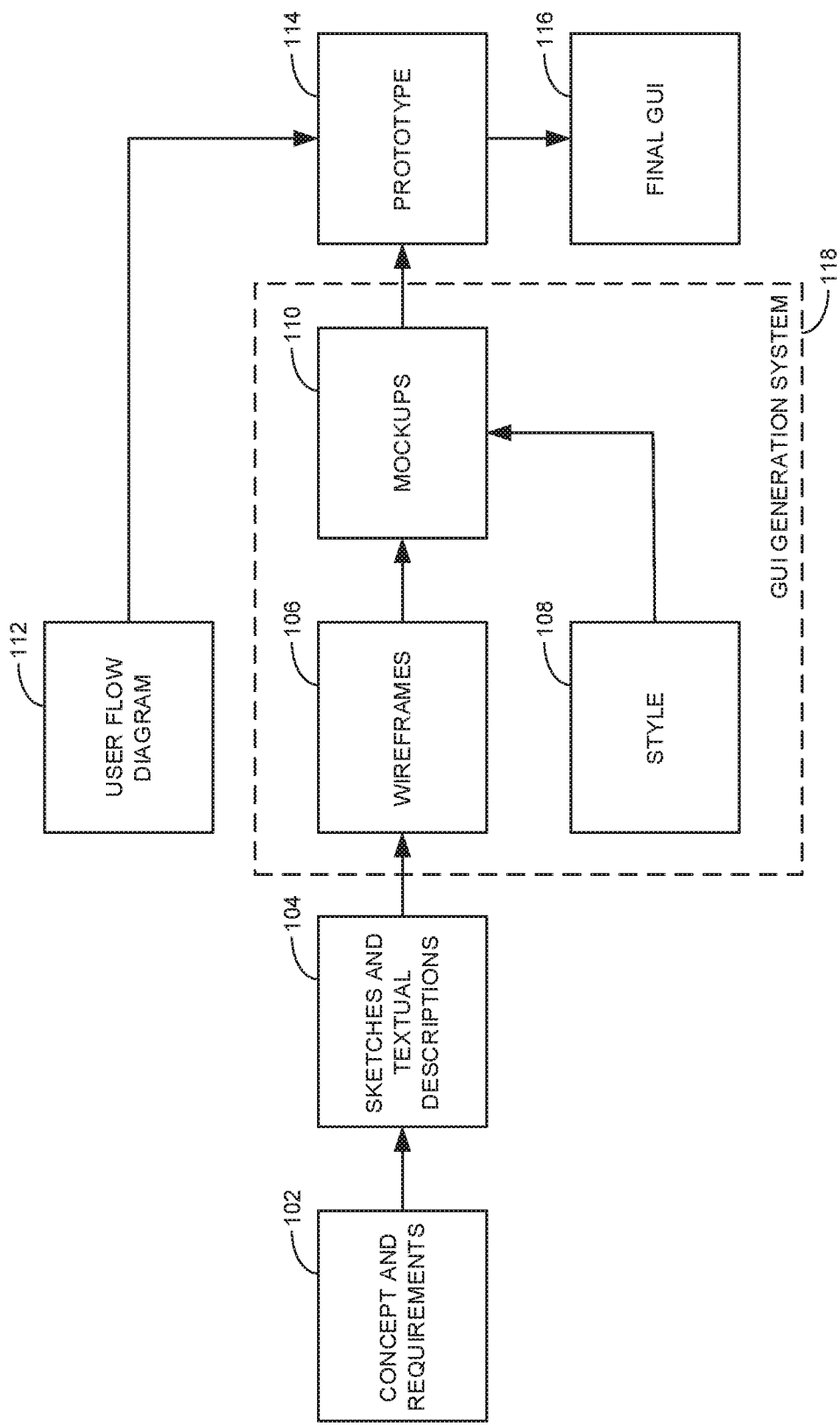
FIG. 1 is a block diagram representing a typical process flow to generate a graphical user interface (GUI).

FIG. 1 is a block diagram representing a typical process flow to generate a graphical user interface (GUI). The resulting GUI may be used for any purpose such as, for example, a GUI for an application executed on a computer, a website GUI, etc. As shown in the illustrated example, the process begins where initial concepts and requirements 102 are provided by a customer and/or graphic designer. Often, the initial concepts and requirements are provided and/or represented via one or more sketches and textual descriptions 104 of a UI design and/or its associated appearance and/or functionality. In many instances, the sketches may be hand drawn by a person using a pen or paper (or any other suitable medium). In other situations, hand drawn sketches may be generated directly on a computer (e.g., sketching on a touchscreen). Once the basic requirements for the design are specified by the sketches and associated textual descriptions 104, the sketches and textual descriptions 104 are converted to one or more wireframes 106. Wireframes 106 provide a relatively low-fidelity, skeletal outline or framework for a GUI that are generating using a computer. Often, the wireframes 106 are limited to rudimentary shapes and/or lines representative of the size and position of visual components of the interface to be created. For example, rather than including an image, a wireframe may include a box with the label "image" to indicate the size and placement of the image.

Separate from the generation of the wireframes 106, the GUI design process includes the generation of styles 108 to be applied to the GUI design. The styles 108 may be developed before, after, and/or in parallel with the wireframes 106. The styles 108 define particular visual characteristics to be applied to each element in the wireframes. Visual characteristics defined by the styles 108 may include borders, font type, font size, coloring schemes (foreground color, background color, font color, etc.), corner rounding, etc.

Once the wireframes 106 and the styles 108 have been defined, they may be combined to form one or more mockups 110. Mockups provide a relatively high-fidelity, detailed view of what the final design is expected to look like as a visual matter. That is, while a mockup will appear like the final UI design (subject to any subsequent revisions), mockups are often static images without any animations or interactive functionality (e.g., active buttons or links to different content associated with different GUI screens) that would be provided in the final working design. The functionalities of different elements in a GUI interacted with by an end user and/or the interactions of content associated with different related GUIs accessed by an end user (e.g., different webpages associated with a common website) are defined by one or more user flow diagrams 112. As shown in the process flow of FIG. 1, one or more prototypes 114 for the GUI design is generated by connecting the user flow diagrams 112 with the mockups 110. The prototypes 114 include functionality to simulate user interactions with the interface, thereby enabling the verification of the user flow and other aspects of the functional operation of the GUI. Thereafter, a final GUI 116 is generated that includes all animations, functionality, and other aspects that may be part of the GUI design that are incorporated with other relevant code underlying the operation of the GUI (e.g., code enabling the processing of financial information for an ecommerce website).

The process from the original brainstorming and concept generation to a final implementation of a GUI design is an iterative process that often takes a considerably amount of time. Different software applications and other systems have been developed to facilitate respectively different stages in this process. For example, some solutions provide predesigned modules that a designer and/or programmer may use as a starting point in created particular GUI designs. Other solutions enable a designer and/or programmer to manually drag-and-drop a wireframe and/or visual elements/objects to generate a complete wireframe and/or an associated mockup. Further, some solutions enable the designer and/or programmer to define certain properties for the objects to form the wireframe and/or mockup. Based on this initial work of the designer and/or programmer, such solutions may generate code for the visual content as specified by the user. However, such code is typically limited to the visual appearance of the interface and, therefore, not fully functional or integrated with code defining functionality and/or user interactions associated with the visual elements. As such, additional user input is necessary before a wireframe and/or associated mockup is capable of being combined with user flow diagrams to generate a working prototype.

While the above known approaches can streamline certain aspects of GUI design development, they still involve user input throughout the process rather than being fully automatic. Among other things, known solutions typically do not automatically define style components for different visual elements, but leave it up to the designer and/or programmer to specify. Further, existing solutions often limit a designer's freedom in creativity. That is, in an effort to reduce the time-to-design, many existing solutions include various pre-designed options such that other options may not be available, thereby constraining the creativity process. For example, buttons for a GUI may be restricted to a rectangular shape rather than providing a designer with the freedom to define the shape of a button at the pixel-wise level. Rather than saving time, in some instances, such restrictions can create more work for a designer because a revision to the design concept may require significant modifications and/or a complete rebuild of the project to fit the revisions into the confines of the restrictive design process. For example, if text needs to be added to an area that was not originally specified with enough space, adjusting the size of the text area will disrupt the size and/or placement of adjacent elements in the design that can undermine the integrity of the initial design generation.

Examples disclosed herein enable the generation and/or synthesis of instructions (e.g., executable code or script) for mockups that are in a state capable of integration with user diagram flows for subsequent prototyping. In some examples, the instructions are synthesized without human input other than providing the initial concepts and requirements 102 based on the sketches and textual descriptions 104. That is, example GUI generation systems disclosed herein implement the aspects of the process flow contained within the dashed box 118 of FIG. 1, which includes the generation of wireframes 106, styles 108, and mockups 110 in a fully automatic matter based on user-provided sketches and associated textual descriptions.

More particularly, in some examples, visual and textual descriptions of a GUI provided by a designer are captured and processed through a series of artificial intelligence (AI) processes to first identify the visual aspects and features to be included in the GUI design, and then to generate instructions (e.g., executable code or script) defining a design proposal reflective of the identified aspects and features. In some examples, many different design proposals may be generated as specified by corresponding instructions and/or code automatically generated for each such design proposal. Automatic generation of the wireframes, styles, and mockups 106, 108, 110, as well as the subsequent code generation can significantly reduce the time-to-prototype. Furthermore, inasmuch as the instructions and/or code is generated ready for use in creating the prototype 114, any changes in design can be immediately translated to the prototype stage, thereby reducing the time and effort required by human designers and/or programmers per iteration. Further, users of the example systems disclosed herein need not be graphic designers and/or computer programmers to generate stylish and/or functional GUIs because the generation of wireframes, styles, and mockups 106, 108, 110 that serve as the basis for a final GUI design are fully automated (subject to basic initial inputs by the user). Further, the code synthesized from the initial user inputs (e.g., sketches and descriptions) may be for any suitable programming language (e.g., hypertext markup language (HTML) for websites, C/C++ for many computer software application GUIs, etc.)

Figure 2:
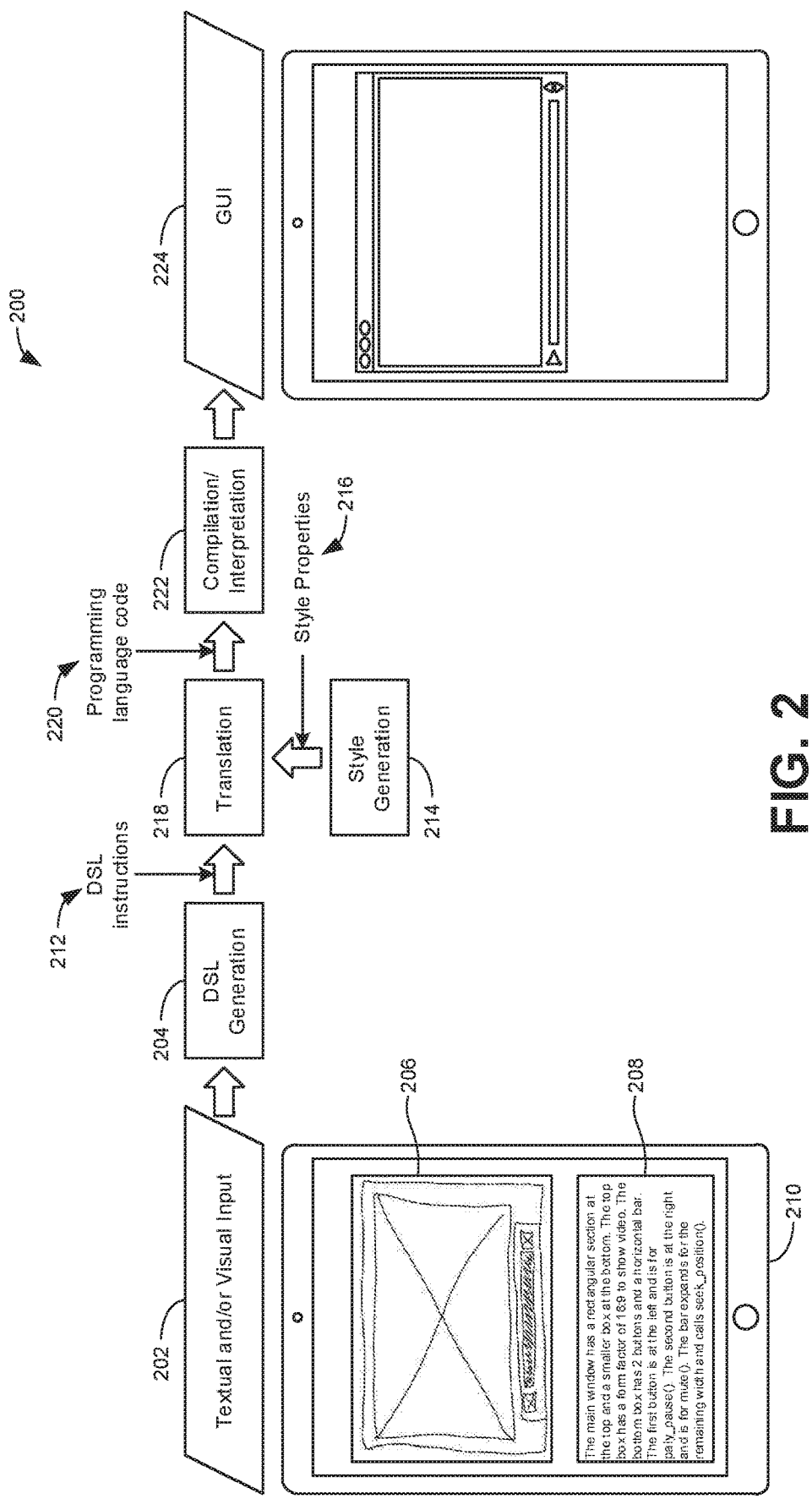
FIG. 2 is an example process flow to generate code corresponding to mockups for a GUI design in accordance with teachings disclosed herein.

The generation of the synthesized code and corresponding mockups output by example systems disclosed herein may be accomplished according to the example process illustrated in the flow diagram 200 of FIG. 2. As shown in the illustrated example of FIG. 2, the process begins with a user providing textual and/or visual inputs 202 to a DSL generation stage 204. In some examples, the textual and/or visual inputs 202 include one or more user-provided input images 206 and/or a user-provided textual description(s) 208 which may be associated with the input images 206.

The textual and visual inputs 202 may be provided to the system through any sort of input device. For example, the input images 206 may be hand drawn sketches made on paper and then input to the example GUI generation system via a scanner. Alternatively, the input images 206 could be captured as an image via a camera that is then provided to the example GUI generation system. In some examples, the input images 206 may be sketched directly on a touchscreen of a computing device (e.g., the example tablet 210 shown in FIG. 2) executing any suitable graphic design and/or drawing application. Although the user-provided input images 206 may be hand drawn sketches that are relatively rough (e.g., the sketches may have imperfect lines and/or shapes as shown in the example input image 206 of FIG. 2), this need not be the case in every instance. In some examples, the input images 206 may be created by a computer-assisted human to include straight lines, boxes, etc. However, as described more fully below, an advantage of examples disclosed herein is that an imperfectly hand drawn sketch is sufficient for the system to generate suitable GUI designs such that the time and expense for a human to generate precise (computer-based) drawings is unnecessary. As with the input images 206, the textual description 208 may be handwritten and/or typewritten statements that are imaged with a scanner or camera and subsequently converted to digital text. In some examples, the textual description 208 may be based on a verbal description captured by a microphone that is subsequently converted to digital text.

In some examples, the textual description 208 may be entered by the user via a keyboard and/or in any other suitable manner.

The DSL generation stage 204 analyzes and processes the textual and visual inputs 202 using a combination of AI models described further below to output a DSL (domain specific language) instructions 212 (e.g., executable code or script) (instructions which may be executed by a machine—perhaps after compiling or other processing into machine code). DSLs are computer languages that are specialized to a specific task or application. The main idea behind DSLs is to facilitate expressing problems and solutions in a specific domain. In examples disclosed herein, the DSL instructions output from the DSL generation stage 204 are based on a DSL that has been particularly defined to represent all the desired visual aspects of a final GUI. With such a DSL, a visual description of a GUI or the underlying building blocks for a final GUI (e.g., wireframes, mockups, etc.) may be defined by one or more DSL statements. For example, a DSL statement may define that a button for a wireframe is a rectangle with an "x" inside. The DSL instructions 212 output from the DSL generation stage 204 contains all necessary DSL statements to fully define a particular GUI design. Therefore, it is possible to render the DSL instructions 212 into a visual representation (e.g., a wireframe and/or mockup). Accordingly, in some examples, a rendering tool is implemented to generate or render an image based on the DSL instructions. In some such examples, the image rendering is implemented as part of the DSL generation stage 204 because such rendered images are compared against the initial input image 206 in subsequent iterations of the AI processes to update the DSL instructions and, therefore, update the rendered image. That is, in some examples, the DSL instructions 212 generated by one iteration of the DSL generation stage 204 are used as the basis to generate an updated version of the rendered image that is compared with the user-provided input image in a subsequent iteration of the process resulting in an updated DSL instructions. The process may repeat to repeatedly generate new DSL instructions until the resulting image rendered from the DSL instructions corresponds to the user-provided textual and visual input 202.

While it is possible to render an image based on DSL instructions, converting a visual image to corresponding DSL instructions is not easy because the initial input image may contain ambiguities (e.g., both a button and an image are represented in the image by a rectangle with an "x" inside). Thus, in some examples, the DSL instructions 212 output from the DSL generation stage 204 are not based exclusively on an analysis of the initial user-provided input image 206. Rather, the DSL instructions 212 may be based on the input image 206 in conjunction with a textual description 208, which provides explanatory comments that can be parsed to resolve any discrepancies and/or ambiguities in the input image 206 (e.g., to provide additional clarifying details that may not be apparent from the input image 206).

Separate from the DSL generation stage 204, the example process flow 200 of FIG. 2 includes a style generation stage 214 to generate style definitions and/or properties 216 to be applied to the different visual elements of the GUI design defined by the DSL instructions 212. More particular, in some examples, the style properties 216 are incorporated with the DSL instructions 212 during a translation stage 218. Although described above as being separate from the DSL generation stage 204 (because the style generation stage 214 may be implemented independently of (e.g., in parallel with) the DSL generation stage 204), in some examples, aspects of the DSL instructions 212 output from the DSL generation stage 204 may serve as inputs to constrain particular styling properties produced during the style generation stage 214.

In the translation stage 218, the DSL instructions 212 may be translated (with the style properties 216 connected therewith) into a target programming language code or framework 220 corresponding to the particular end-use application intended for the GUI design. In some examples, existing programming languages and/or styling languages are employed as appropriate. For example, if the GUI is generated for use with a particular website, the DSL instructions 212 may be translated to the hypertext markup language (HTML) and the style properties 216 translated into the Cascading Style Sheets (CSS) language. If a style language (e.g., CSS) is used separate from the programming language, the translation stage 218 also includes making connections between the languages. In some examples, when the style and the program are based on different languages, the style properties 216 may be translated first, followed by translation of the DSL instructions 212. In other examples, the DSL instructions 212 may be translated first, followed by the style properties 216. In some examples, multiple different translators may be provided to enable the translation of the DSL instructions 212 and/or the style properties 216 into different programming and/or style languages.

In the illustrated example, the DSL generation stage 204 and subsequent translation stage 218 are divided into separate stages to enable the example GUI generation system to convert the same DSL instructions 212 into many different target programming languages or frameworks 220. In some examples, where the desired framework for the programming language code is known, the DSL generation stage 204 and the translation stage 218 may be combined.

The output programming language code 220 corresponds to the result associated with the wireframes 106, the styles 108, and the mockups 110 generated by an example GUI generation system associated with the dashed box 118 of FIG. 1. As described above, in connection with FIG. 1, further processing includes the generation of a prototype 114. Accordingly, as represented in the illustrated example of FIG. 2, a compilation and/or interpretation stage 222 involves running a compiler and/or interpreter to generate a full prototype of the final GUI 224. A compiler converts the programming language code 220 into binary code that can be run after compilation. An interpreter directly runs the code. In both cases, executing the code creates a GUI 224 that can be visualized by a user. In some examples, the resulting GUI (or multiple different GUIs) may be combined based on user flow diagrams 112 (FIG. 1) to produce a full prototype GUI design. In such examples, this last stage in the process is relatively streamlined because the programming language code 220 has already been generated in the programming language corresponding to the particular end use application for the prototype (and any resulting final GUI).

As mentioned above, examples disclosed herein are based on artificial intelligence (AI). Artificial intelligence, including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures (e.g., neural networks) exist. In examples disclosed herein, multiple different types of AI models are employed including convolution neural networks (CNNs), recurrent neural networks (RNNs) (including generic RNNs, long short-term memory (LSTM) networks, and/or gated recurrent unit (GRU) networks), spatial transformer networks (STNs), multilayer perceptron (MLP) neural networks, and generative adversarial networks (GANs). In general, AI models/architectures that are suitable to use in example approaches disclosed herein will be black box networks in which user insights into the operation and/or interpretability of the connections in the models is not relevant. While certain types of AI models are described to implement particular aspects of examples disclosed herein, other types of AI models may alternatively be used and/or ones of the models mentioned above and described further below may be used for other aspects of the example GUI generation systems disclosed herein than what is described below.

In general, implementing an AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of AI model and/or the expected output. For example, supervised training uses inputs and corresponding expected (e.g., labeled) outputs to select parameters (e.g., by iterating over combinations of select parameters) for the AI model that reduce model error. As used herein, labelling refers to an expected output of the machine learning model (e.g., a classification, an expected output value, etc.) Alternatively, unsupervised training (e.g., used in deep learning, a subset of machine learning, etc.) involves inferring patterns from inputs to select parameters for the AI model (e.g., without the benefit of expected (e.g., labeled) outputs). In examples disclosed herein, training the AI models associated with the DSL generation stage 204 of FIG. 2 is performed in a supervised manner, whereas the training of the AI models associated with the style generation stage 214 of FIG. 2 is performed in an unsupervised manner.

In examples disclosed herein, AI models are trained using any suitable stochastic gradient-based process. However, any other training algorithm may additionally or alternatively be used. In examples disclosed herein, training is performed until the system converges. In examples disclosed herein, training may be performed offline at a remote location (e.g., a central facility) prior to the use of the AI models by an end user.

Once training is complete, the model is deployed for use as an executable construct that processes an input and provides an output based on the network of nodes and connections defined in the model. In some examples, the AI models are both stored and executed on an end user computing device (such as the example computing device 600 of FIG. 6).

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, a GUI and/or a mockup of a GUI, etc.).

As mentioned above, in some examples, convolutional neural networks (CNNs) are implemented in disclosed examples because they are well adapted to analyzing visual inputs. More particularly, in some examples, a CNN is used during the DSL generation stage 204 of FIG. 2 to compare the user-provided input image 206 with a rendered image corresponding to an approximation of the final GUI design to identify differences between the images. Any differences identified between the images are then used to modify or update the rendered image in another iteration (timestep) in the process.

As mentioned above, in some examples, RNNs are implemented in disclosed examples because they have the ability to process variable length sequences. A common application for RNNs is in natural language processing where language data (e.g., speech and/or text) to be processed can vary in length (e.g., from a few words, to a full sentence, to multiple sentences, etc.). More particularly, RNNs are effective at both (1) interpreting or understanding language data and (2) generating language data. Thus, in some examples, an RNN is used during the DSL generation stage 204 of FIG. 2 to interpret or understand the user-provided textual description 208 of a GUI design. Further, in some examples, the encoding of the textual description 208 by a first RNN are provided as an input to a second RNN used to generate DSL statements to be included in the DSL instructions 212 output from the DSL generation stage 204. In some examples, the results of the image analysis performed by the CNN serves as the basis for a separate input to second RNN (in addition to the encoded representation of the textual description 208). That is, in some examples, the second RNN analyzes encoded information associated with the user-provided input image 206 and/or the textual description 208 to generate DSL commands that serve as the basis to generate DSL statements for the DSL instructions 212. The DSL commands output by the second RNN are in the form of DSL statements and, therefore, could be referred to as DSL statements. However, the DSL commands are incomplete statements because they do not include positional or spatial information (e.g., size and position) for the elements of the GUI being defined. Thus, for the sake of clarity, an incomplete DSL statement (output by the RNN that does not include positional information) is referred to herein as a DSL command to distinguish it from a complete DSL statement (that includes position information), which is referred to herein simply as a DSL statement. In some instances, a particular DSL statement may not include positional information. In such situations, the DSL command output by the second RNN is the same as the final DSL statement. Although RNNs may be used to process the user-provided textual and/or visual inputs to generate DSL instructions representative of wireframes and/or mockups for a GUI design, other types of AI models may be used for these purpose such as transformer networks and time-delay convolutional neural networks.

Figure 3:
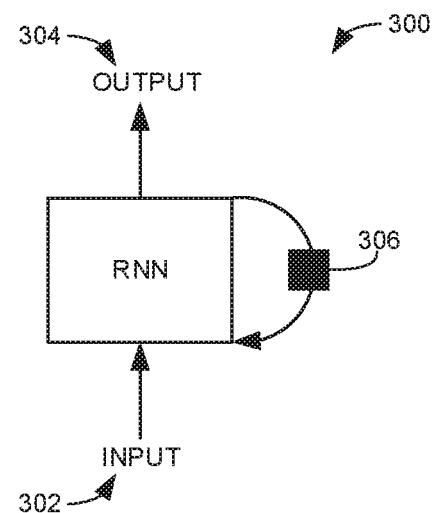
FIG. 3 is a representation of an example recurrent neural network (RNN) layer that may be implemented in accordance with teachings disclosed herein.
Figure 4:
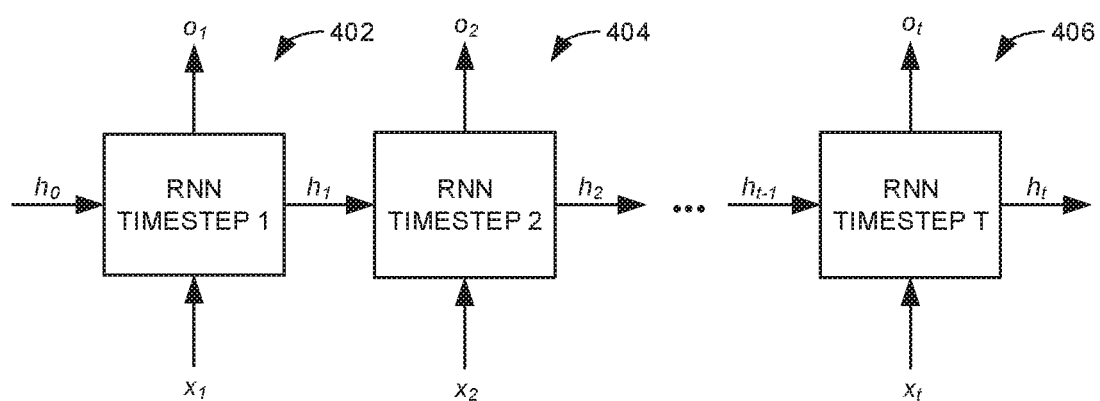
FIG. 4 represents the operation of the RNN layer of FIG. 3 over time.

FIG. 3 represents an RNN layer 300 and FIG. 4 represents the operation of the RNN layer 300 of FIG. 3 over time. The RNN layer 300 processes an input 302 at each timestep and produces a resulting output 304. Additionally, the RNN layer 300 generates a hidden state 306 at each timestep that is delayed for use during the following timestep. Specifically, for an input sequence $(x_1, x_2, \ldots, x_t)$, an RNN computes an output $(o_i)$ at a timestep (i) based on a non-linear function $(f)$ of the hidden state $(h_t)$ (or "current state") and the input $(x_t)$ at the same timestep. Stated mathematically, $h_t=f(x_t, h_{t-1})$ and $o_t=g(h_t)$. This is demonstrated graphically with reference to FIG. 4. At the first timestep 402, the RNN 300 calculates a first output $o_1$ and the next hidden state $h_1$ based on a first input $x_1$ and an initial hidden state $h_0$ (which may be defined by some initialization value). Thereafter, the hidden state $h_1$ output at the first timestep 402 is then used in the RNN 300 at a second timestep 404 along with a second input $x_2$ to calculate a second output $o_2$ and a new hidden state $h_2$ that will be used in the next timestep (e.g., timestep 4). At each new timestep, the hidden state h is updated and reused at the next timestep to process a new input value. This process repeats until a final timestep 406 is implemented. This repeating process with a constantly updating hidden (current) state is why RNNs are called "recurrent" neural networks. The process of computing new outputs and new hidden states can be repeated for any duration associated with processing input data of any suitable length. As such, RNNs are a practical AI model to process input sequences with variable lengths such as natural language, speech, audio, or, more particularly, as in examples disclosed herein, textual descriptions 208 and/or repeated comparisons of rendered images to the user-provided input image 206. While RNNs are suitable for variable-length inputs, RNNs output a fixed-length multidimensional vector. The RNN 300 of FIGS. 3 and 4 is shown as described as a single layer for purposes of explanation. In many situations, RNNs can be stacked into deeper layers to increase the model performance.

As mentioned above, in some examples, spatial transformer networks (STNs) are implemented in disclosed examples because of their ability to extract spatial information such as the size, shape, and/or position of elements in a visual input. More particularly, as described more fully below, in some examples, an STN is used during the DSL generation stage 204 of FIG. 2 to analyze the output of the CNN (identifying differences between a user-provided input image 206 and a rendered image) to identity positional information (e.g., position and/or size) associated with elements that are different between the rendered and user-provided input images compared by the CNN. In some examples, the positional information is associated with the DSL commands generated by the second RNN described above to generate complete DSL statements that not only define what elements (e.g., objects) are to appear in a GUI design, but also the size and placement of such elements.

As mentioned above, in some examples, multilayer perceptrons (MLPs) are implemented in disclosed examples because of their ability to distinguish data that is not linearly separable. MLPs are characterized by three layers of nodes with one hidden layer. The nodes in the hidden and output layers use nonlinear activation functions. In some examples, an MLP is used during the DSL generation stage 204 of FIG. 2 to encode the output of the CNN for subsequent analysis by the second RNN mentioned above. Additionally, the DSL commands output by the second RNN (along with the positional information output by the STNs) are provided to different MLPs to determine relevant positional property values that enable the complete DSL statements to be defined. Thus, in some examples, MLPs are used in multiple different locations within the example GUI design generation process.

As mentioned above, in some examples, generative adversarial networks (GANs) are implemented. GANS are unsupervised learning models that are capable of learning a probability distribution and, therefore, are able to draw samples from the distribution. More particularly, in examples disclosed herein, GANs are pretrained to learn a probability distribution associated with different types of styles for GUIs. Once trained, the GANs are implemented to draw styles from the distribution that may then be applied to particular aspects of a GUI design as defined by the code (e.g., instructions which may be executed by a machine—perhaps after compiling or other processing into machine code) produced by the RNN described above (in association with the CNN, STN, and MLPs). In some examples, two separate GANs are implemented. As described more fully below, in some examples, a first GAN draws global styles to be applied to all DSL statements generated from the processes described above and a second GAN draws local styles to be applied to particular GUI design elements when the global style is not applicable and/or no global style is defined for the particular element. Although GANs are suitable for generating and/or identifying styles in this manner, other types of AI models may be used instead such as variational autoencoders.

Figure 5:
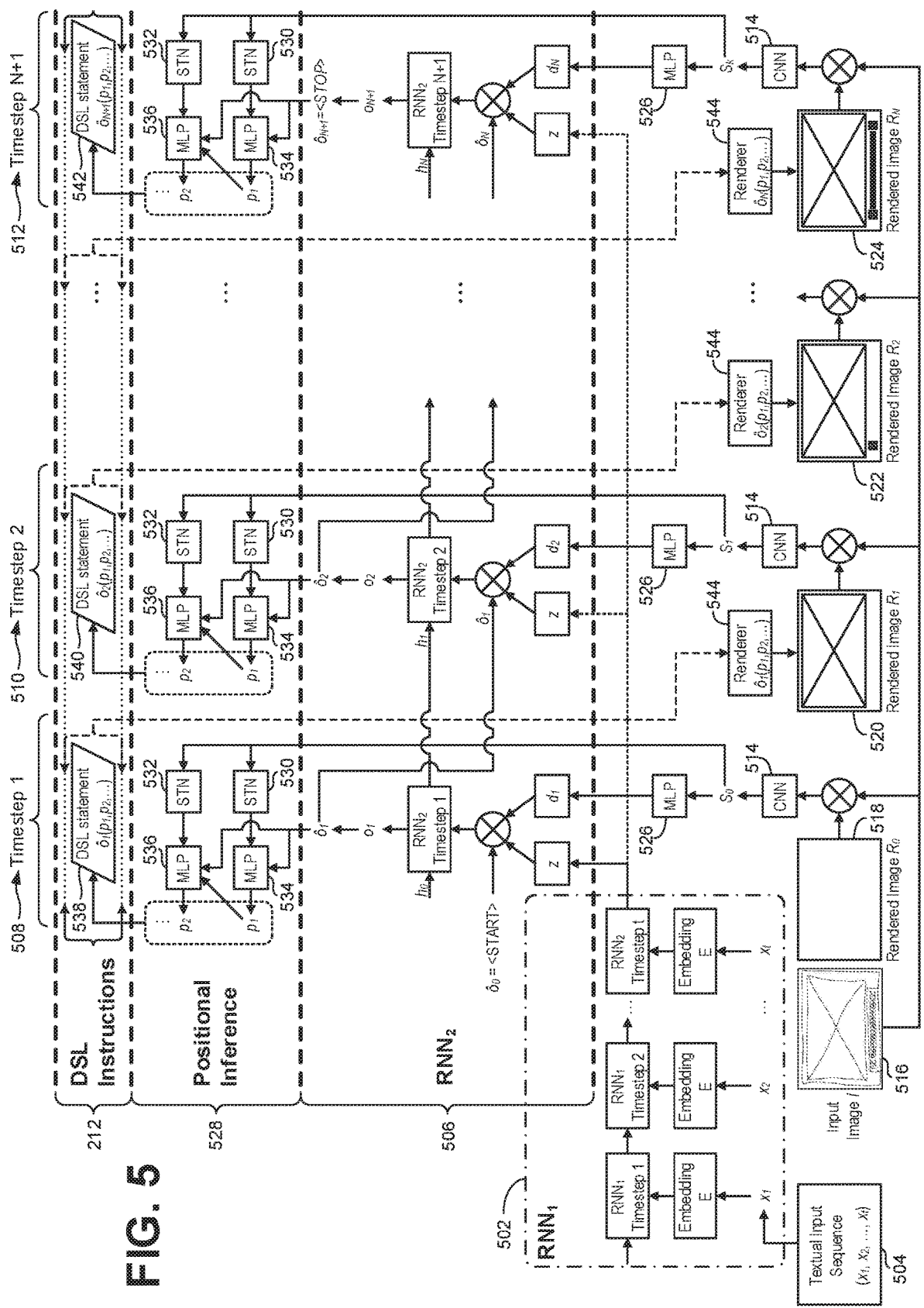
FIG. 5 is a block diagram illustrating an example implementation of the DSL generation stage of FIG. 2 over multiple timesteps for the relevant AI models involved.

FIG. 5 is a block diagram illustrating an example implementation of the DSL generation stage 204 of FIG. 2 over multiple iterations or timesteps for the relevant AI models involved. More particularly, in the illustrated example of FIG. 5, two separate iterative processes are represented. Specifically, the first iterative process corresponds to the implementation of a first example RNN 502 that analyzes a textual input sequence 504. In this example, the textual input sequence 504 corresponds to the textual description 208 associated with a user-provided input image 206. In some examples, the individual elements $(x_1, x_2, \ldots, x_t)$ of the textual input sequence 504 corresponding to each individual word in the textual description 208. The first example RNN 502 computes an encoded representation of the textual input 504 (e.g., converts the text to vectors) based on any suitable embedding method. More particularly, the encoded representation, z, is computed by $$z = h_{t+1}^{RNN_1} = \mathrm{RNN}_1(E \cdot x_{1:t}, h_0^{RNN_1}) \qquad \text{Eq. 1}$$

where $x_{1:t}$ is the sequence of textual input of length t words $(x_1, x_2, \ldots, x_t)$, and E represents a word embedding method. The input $h_0^{RNN_1}$ is the initial hidden state for $RNN_1$, and it is typically initialized to the zero vector.

In some examples, if new text is added to the textual input 504 (e.g., new words $x_{t+1}, \ldots, x_{t+l}$), the first RNN 502 updates the encoding z by feeding the rest of the sequence from the last known state of the first RNN. The encoded representation z is a multidimensional vector compactly describing the information in the textual input 504 and, as shown in the illustrated example, serves as an input to a second example RNN 506. More particular, the encoded representation z serves as an input to each iteration or timestep of the second RNN 506. As such, in some examples, the first RNN 502 is executed to completion (to generate the encoded representation z) before initiating the second RNN 506 and the rest of the DSL generation stage 204. Thus, the timesteps (from timestep 1 to timestep t) associated with the first RNN 502 shown in the illustrated example of FIG. 5, are distinct and separate from the timesteps 508, 510, 512 (from timestep 1 to timestep N+1) associated with the second RNN 506 shown in the illustrated example of FIG. 5.

As shown in FIG. 5, another input to the second RNN 506 (separate from the encoded representation z of the textual input 504) is based on the output of an example CNN 514. In this example, the CNN 514 analyzes and/or compares an input image 516 with different rendered images 518, 520, 522, 524 generated for each iteration of the second RNN 506. Specifically, the example CNN 514 outputs a multidimensional tensor of feature maps, $S_k$, indicative of differences between the compared images:

$$S_k = CNN([I; R_k])  \quad \text{Eq. 2}$$

where I is the input image 516 and $R_k$ is the rendered image corresponding to the kth input to the second RNN 506, where k is one less than the time step (e.g., k=0 at the first timestep 508). Stated differently, $R_k$ is the rendered image after k DSL statements have been produced during the DSL generation stage 204. In other words, as discussed more fully below, each iteration or timestep of the second RNN 506 results in the generation of one DSL statement that is then used (in combination with all previously generated DSL statements) to generate a new rendered image for use in the next timestep of the second RNN 506. Each rendered image may be conceptualized as an approximation of the final GUI design such that the any differences with the visual input image determined by the CNN 514 are used to determine how to modify or update the rendered image to more closely approximate the final GUI design. This process repeats until the rendered image converges to the final GUI design. In some examples, the initial rendered image 518, before the second RNN 506 begins (e.g., the rendered image $R_0$), is an empty image. In some examples, the input image 516 of FIG. 5 (used in every timestep of the second RNN 506) corresponds to the user-provided input image 206 shown in FIG. 2. In some examples, the user-provided input image 206 may undergo pre-processing (e.g., to normalize the image size) to generate the input image 516 that is fed into the CNN 514.

In some examples, an encoded representation (e.g., an embedding $d_{k+1}$) of the images analyzed by the CNN 514 is computed by passing the feature maps $S_k$ through a multi-layer perceptron (MLP) neural network 526 (e.g., $d_{k+1}$=MLP$(S_k)$=MLP(CNN([I; $R_k$]))). The encoded representation of the images $d_{k+1}$ is a multidimensional vector.

As noted above and shown in the illustrated example of FIG. 5, both the encoded representation of the images $d_{k+1}$ and the encoded representation z of the textual input 504 are provided as inputs to the second RNN 506. In this example, the second RNN 506 is implemented as a text generator. More particularly, the second RNN 506 generates DSL commands that define the appearance of a GUI (e.g., define an associated wireframe and/or mockup). As mentioned above, as used herein, a DSL command differs from a DSL statement in that a DSL command does not include positional information while a DSL statement is associated with positional information. In some examples, a third input to the second RNN 506 includes the DSL command generated during the previous timestep of the RNN. That is, at timestep k+1, the DSL command $ô_k$ is provided as an input to the second RNN 506 along with encoded representation of the images $d_{k+1}$ and the encoded representation z of the textual input 504. In the illustrated example, during each iteration or timestep, the second RNN 506 maintains a hidden state $h_k^{RNN_2}$ (from the previous timestep) and outputs the next hidden state $h_{k+1}^{RNN_2}$ as well as an output $o_{k+1}$:

$$h_{k=1}^{RNN_2} = RNN_2([d_{k+1}; z; ô_k], h_k^{RNN_2}) \quad \text{Eq. 3}$$

$$o_{k+1} = g(h_{k+1}^{RNN_2}) \quad \text{Eq. 4}$$

where, in some examples, the initial hidden value $h_0^{RNN_2}$ is set to 0.

In some examples, the second RNN 506 includes the implementation of a softmax function to generate the output $o_{k+1}$. As a result, the output $o_{k+1}$ of the second RNN 506 represents a categorical distribution of possible DSL commands that could be the basis for the final DSL instructions to be generated by the iterative process. Thus, in some examples, the final output DSL command $ô_{k+1}$ at the corresponding timestep is generated by sampling the object $ô_{k+1}$. More particularly, in some examples, the output DSL command $ô_{k+1}$ corresponds to a particular DSL command (or command category) having the highest probability in the categorical distribution represented by the output $o_{k+1}$. In some examples, where multiple potential DSL commands have similar probabilities in the distribution, one of the DSL commands may be randomly selected for the output DSL command $ô_{k+1}$.

In some examples, an initial command "<START>" and an ending command "<STOP>" are defined as categories represented in the distribution of the output $o_{k+1}$ to indicate the beginning and ending of the second RNN 506. Thus, as shown in the illustrated example, the initial DSL command input to the second RNN 506 at the first timestep is $ô_0$=<START> and the final DSL command generated at timestep N+1 is $ô_{N+1}$=<STOP>.

While the example second RNN 506 is able to generate DSL commands defining visual elements to be included in a resulting GUI, the RNN 506 does not define the size and/or position of such elements. For example, during the first timestep 508, based on the analysis of the CNN 514 (comparing the input image 516 to the first rendered image 518) and the analysis of the first RNN 502 (encoding the textual input sequence 504), the second RNN 506 may determine that the rendered image 518 (currently a blank image at timestep 1) needs (a) a 16:9 box to show video, (b) a first button for play/pause, (c) a second button for mute, and (d) a bar to adjust the position of the video. Each of these different elements may be defined by a particular DSL command. Further, assume in this example that the first element corresponding to the 16:9 box to show video is associated with the highest probability in the categorical distribution represented by the output $o_1$. Accordingly, in this example, the final DSL command $ô_1$ output by the RNN 506 at the first timestep 508 will specify a 16:9 box for video. However, as noted above, specifying the need for a 16:9 box to show video in the rendered image 518 does not specify the size of the box or its position within the rendered image 518. Accordingly, in some examples, positional properties for a DSL command $ô_{k+1}$ generated by the second RNN 506 is determined using a positional inference analyzer 528.

More particular, as shown in FIG. 5, the positional inference analyzer 528 includes a series of STNs 530, 532 and a corresponding series of MLPs 534, 536. In some examples, the feature maps $S_k$ generated by the example CNN 514 is provided as an input to the STNs 530, 532. The outputs of the STNs 530, 532, along with the DSL command $ô_{k+1}$ output by the second RNN 506, are provided as inputs to the corresponding MLPs 534, 536, to infer a value for the positional properties ($p_1, p_2, \ldots$) associated with the DSL command $\hat{o}_{k+1}$. In some examples, as represented in the illustrated examples, the MLPs 534, 536 are implemented as a cascading series where the output of one MLP 534 is provided as an input to the next MLP 536. The DSL command $\hat{o}_{k+1}$ output by the second RNN 506 during a particular timestep and the corresponding positional property values collectively define the DSL statement $\hat{o}_{k+1}(p_i, p_2, \ldots)$ generated at the particular timestep for the RNN 506. Thus, as shown in the illustrated example, multiple DSL statements 538, 540, 542 are generated by the example system as the process executes multiple iterations of the second RNN 506. All of the DSL statements 538, 540, 542 produced by the second RNN 506 (and the other associated processes) collectively correspond to the DSL instructions 212 corresponding to the final output of the DSL generation stage 204 described above in connection with FIG. 2.

In some examples, the DSL statement 538, 540, 542 generated during each timestep of the second RNN 506 is used as the basis for a new rendered image to be generated as an input to the next iteration of the RNN 506. More particularly, in some examples, all of the DSL statements $\hat{o}_k(p_1, p_2, \ldots)$ (including the corresponding DSL commands $\hat{o}_k$ and the positional property values ($p_1, p_2, \ldots$)) generated by the second RNN 506 thus far (based on the number of iterations already processed by the RNN) are used by an example renderer 544 to generate a new rendered image $R_k$. Thus, for example, the first rendered image 520 after executing the second RNN 506 through one iteration includes a 16:9 box for video (as defined by the DSL command $\hat{o}_1$ associated with the first DSL statement 538) that is appropriately sized and placed (based on the positional information indicated by the positional property values ($p_1, p_2, \ldots$) associated with the first DSL statement 538). Thereafter, the new rendered image 520 is provided as a new input to the example CNN 514, along with the original input image 516, to repeat the process outlined above. After the generation of the second DSL statement 540 at the end of the second timestep 510, both the first and second DSL statements 538, 540 are provided to the example renderer 544 to produce the third rendered image 522. This process continues with the renderer 544 generating a rendered image based on one additional DSL statement (in addition to all previously generated DSL statements) after each successive iteration of the second RNN 506. In some examples, where the input image 516 is a hand drawn sketch that is likely to have imperfect lines, the rendered image 520 may be rendered with noise and/or based on versions of the DSL statements associated with hand-drawing styles.

As noted above, the process repeats through multiple iterations of the second RNN 506 until the DSL command output by the RNN 506 is the "<STOP>" command. As noted in the illustrated example, this corresponds to timestep N+1. The last rendered image 524 in the process (e.g., generated based on the DSL statement produced at timestep N) corresponds to the image to be presented to a user as a visualization of the generated DSL instructions 212 corresponding to a GUI design to be associated with a mockup (once styling definitions are incorporated therein as described below). In some examples, implementation of the DSL generation stage 204 of FIG. 2 outlined in detail with reference to the illustrated example of FIG. 5, can be completed in a few hundred milliseconds. As such, a user can be provided with computer rendered images associated with a particular GUI design based on nothing more than a hand drawn sketch and some basic textual description in substantially real-time (e.g., less than a second). This significantly reduces the time-to-design and can make it much easier for designers to iterate through different design options and/or consider different ideas without undue delays.

The illustrated example of FIG. 5 outlines the inference phase of the underlying AI models. That is, the example process described above is able to generate GUI designs based on visual and/or textual inputs because the AI models have been pre-trained to do so. In some examples, the DSL generation system illustrated in FIG. 5 is trained end-to-end using supervised learning. In such examples, the (labelled) training data includes a dataset of GUIs including their DSL instructions defining the GUIs and textual descriptions of the GUIs. In some examples, hand drawn sketches associated with the GUIs may also be included in the training dataset. In some examples, if hand drawn sketches are not available, such sketches can be simulated by rendering images based on the DSL instructions with simulated noisy hand drawn figures.

All of the different blocks (corresponding to different AI processes) in FIG. 5 are differentiable except for the renderer 544. As a result, the renderer 544 cannot be trained using data flow graph tools (e.g., Tensorflow or Pytorch) that are commonly employed to train neural networks. Thus, in some examples, for a given training sample, the rendered images 520, 522, 524 ($R_0$ through $R_N$) are rendered after each of the sample's DSL statements 538, 540, 542 are generated and passed as an input to the CNN 514. In this manner, the DSL generator system can be trained end-to-end. In some examples, a cross-entropy loss function is used to measure the error when comparing each DSL statement at the output of the second RNN 506 to the corresponding DSL statement from the training data. Further, in some examples, a regression loss function (e.g., Mean Squared Error (MSE)) is used to measure the error for the individual parameters of each of the generated DSL statements.

After generating the DSL instructions 212 through the DSL generation stage 204, the style generation stage 214 can generate style properties or definitions for the DSL statements as needed. In some examples, style properties are defined as optional in the DSL definition. Accordingly, in some examples, style properties are not used to produce the rendered images $R_k$ during the DSL generation stage 204. However, the style properties may be used to generate final mockups and/or instructions (e.g., code or script) to generate a prototype of a GUI design. In some examples, the style generation stage 214 leverages the generator network from generative adversarial networks (GANs). That is, a GAN is an AI system that includes two neural networks including a generator and a discriminator. The process of training a GAN can be described as a contest between the generator that attempts to generate new data that is similar to training data and the discriminator that attempts to distinguish the new data from the training data. The adversarial nature of the two neural networks is what gives generative adversarial networks their names. Over time, the generator network learns to generate new data that is statistically similar to the training data by approximating the distribution of the training data.

Accordingly, in examples disclosed herein, a GAN is trained using data representative of many different styles for GUIs and associated DSL statements defining such GUIs. Once trained, the generator network of the GAN is able to produce styles for new GUIs defined by new DSL statements that correspond to existing styles of existing GUIs (represented in the training data). Based on this principle, the DSL statements in the DSL instructions 212 generated during the DSL generation stage 204 may be provided to a GAN generator network associated with the style generation stage 214 to generate suitable styles for the DSL statements.

In some examples, the style generation stage 214 is implemented using two separate generator networks including a global style generator and a local style generator. In some such examples, the global style generator is pre-trained to generate a set of global values that may be used to define all styling properties for a given GUI design. By contrast, the local style generator is pre-trained to generate a value indicative of a particular style property for a particular visual element in a GUI design.

In some examples, global style properties for a particular GUI design are generated by randomly drawing a global style using the pretrained global style generator. The random drawing of the global style results in plausible style properties for the GUI design because the global style generator is based on a statistical data distribution of the different styles represented in the data set used to train the global style generator. In some examples, the process of randomly drawing global styles is repeated multiple times to generate multiple different styling options that may be presented to a user for selection.

In some examples, a local style property for a particular element in a GUI design is generated by randomly drawing a local style using the pretrained local style generator conditioned by the context of the particular element for which a style is to be applied. That is, in some examples, additional style details are provided as inputs to the local style generator beyond a randomly drawn value. For instance, in some examples, the DSL statement defining the particular element for which a local style is to be provided is included as an input to the local style generator. Further, in some examples, the additional details may include the values associated with the global style properties defined for the GUI so that the local style defined for the particular element of a GUI will be generated to be aesthetically congruent with overall style of the GUI. Additionally or alternatively, in some examples, the additional details input to the local style generator may be style property values corresponding to other particular elements in the GUI. Additionally or alternatively, in some examples, the additional details input to the local style generator may be based on parameter values provided by a user independent of any other styles specified for the GUI. In some examples, a user may specifically define a style for a particular visual element in a GUI design. In such examples, the user-defined style is applied to the relevant visual element rather than a style generated by either of the global or local style generators.

In some examples, both the global style generator and the local style generator as implemented as feedforward neural networks so that the user selection of style for one GUI design does not bias the networks in generating styling options for subsequent GUI designs. In some examples, the style generation stage 214 can be performed in parallel with the DSL generation stage 204 (except for the local style generator that is to generate styles using the DSL statements from the DSL instructions as an input). Implementing the DSL generation stage 204 and the style generation stage 214 in parallel can increase efficiency by reducing additional overhead to the runtime process.

Training of the global style generator and the local style generator is somewhat different. To train the global style generator, a training data set of many GUI styles are used. All possible properties for visual elements (e.g., borders, font type, font size, coloring schemes (foreground color, background color, font color, etc.) are defined as the output dimensions of the global style generator and also as the input dimensions for the global style discriminator. Both the generator and discriminator are trained simultaneously by switching the input of the discriminator between generated styles (from the global style generator) and real styles (from the training dataset).

As mentioned above, the local style generator produces a local style property for a particular visual element based on an input DSL statement and/or additional values constraining the styles to be generated in addition to a randomly drawn number. Accordingly, in some examples, the local style generator is trained using a conditional GAN approach. Such an approach conditions the inputs to both the local style generator and the local style discriminator to include additional information. The generator combines the input and the random values to generate an output for the non-conditional part. Thereafter, the training follows a similar approach described above where the two networks are trained simultaneously with the input for the discriminator switching between generated data and real (training) data. In some examples, the same training data may be used to train both the global style generator and the local style generator. However, training the local style generator is based on extracting samples from the training data based on the DSL statements associated with the training data.

Figure 6:
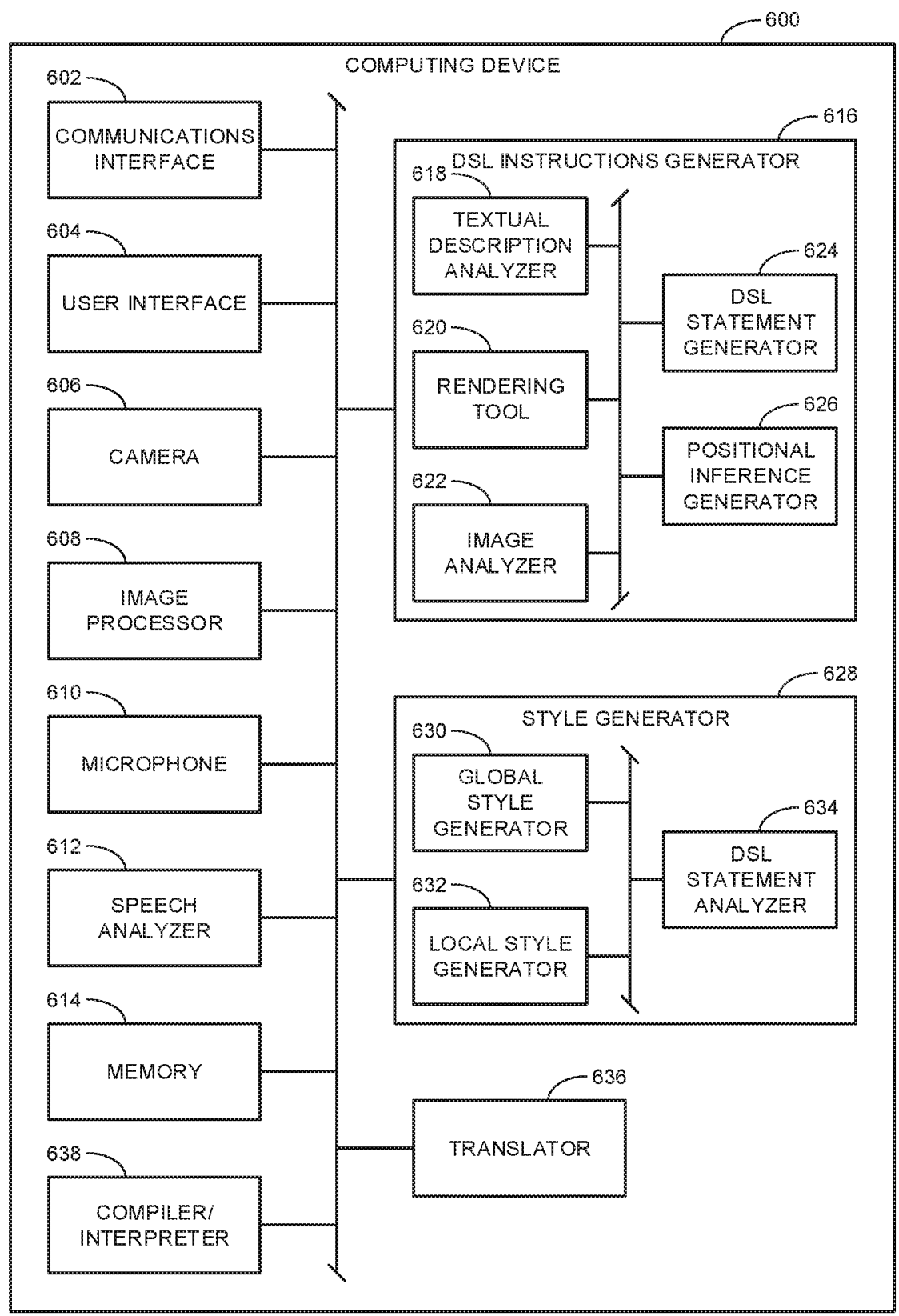
FIG. 6 illustrates an example computing device implemented in accordance with teachings disclosed herein.

FIG. 6 illustrates an example computing device 600 implemented in accordance with teachings disclosed herein. As shown in the illustrated example, the computing device 600 includes an example communications interface 602, an example user interface 604, an example camera 606, an example image processor 608, an example microphone 610, an example speech analyzer 612, example memory 614, an example DSL instructions generator 616 (including an example textual description analyzer 618, an example rendering tool 620, an example image analyzer 622, an example DSL statement generator 624, and an example positional inference generator 626), an example style generator 628 (including an example global style generator 630, an example local style generator 632, and an example DSL statement analyzer 634), an example translator 636, and an example compiler and/or interpreter 638.

The example computing device 600 of FIG. 6 includes the example communications interface 602 to communicate with other computing devices via a hardwired and/or wireless connection. The other computing devices may be local or remote from the example computing device 600 of FIG. 6. In some examples, the user-provided input images and/or user-provided textual descriptions are obtained from a different computing device via the example communications interface 602. For instance, in some examples, the computing device 600 may be communicatively coupled to a scanner via the communications interface 602. In such examples, the scanner may scan hand drawn sketches of a user to generate digital images that serve as the basis for the user-provided input images. Similarly, textual descriptions may also be scanned and provided to the computing device 600 via the communications interface 602.

Additionally or alternatively, in some examples, the user-provided input images and/or user-provided textual descriptions are obtained from the user via the example user interface 604. That is, in some examples, a user may interact directly with the computing device 600 to input textual descriptions (e.g., types in via a keyboard) and/or to generate sketches (e.g., in a drawing program executed on the computing device 600). Further, in some examples, the user interface provides outputs to the user. Outputs to the user include generated wireframes and/or mockups of GUI designs. In some examples, multiple different designs may be provided to the user via the user interface 604.

Additionally or alternatively, in some examples, the user-provided input images and/or user-provided textual descriptions may be captured as an image via the example camera 606 of the example computing device 600. In some such examples, the image processor 608 may perform preprocessing on the captured images to convert the captured images into a suitable format to serve as an input to the DSL instructions generator 616.

Further, in some examples, the user-provided textual descriptions may be captured by the example microphone 610 as the descriptions are verbally spoken by the user. In some such examples, the speech analyzer 612 may analyzes the captures speech to convert it to digital text that can serve as the textual input to the DSL instructions generator 616.

The example computing device 600 of FIG. 6 includes the example memory 614 to store the visual and textual inputs provided by the user. Further, in some examples, the memory 614 stores the AI models executed by the example DSL instructions generator 616 and the example style generator 628. In some examples, the AI models are pre-trained at a central facility (e.g., on a remote computing device) and then provided to the example computing device 600 via the communications interface 602 for storage in the example memory 614.

The example computing device 600 of FIG. 6 includes the example DSL instructions generator 616 to execute the AI models and other data processing associated with the DSL generation stage 204 of FIG. 2. That is, the DSL instructions generator 616 implements the process outlined in FIG. 5. More particularly, in some examples, the textual description analyzer 618 of the example DSL instructions generator 616 implements and/or includes the first RNN 502 to generate the encoded representation of the textual input sequence 504. In some examples, the rendering tool 620 of the example DSL instructions generator 616 implements and/or includes the renderer 544 to generate the rendered images based on the DSL statements. In some examples, the image analyzer 622 of the example DSL instructions generator 616 implements and/or includes the CNN 514 to compare the visual input image 516 to the different rendered images 520, 522, 524 generated by the renderer 544 to generate feature maps indicative of difference between the compared images. Further, in some examples, the image analyzer 622 of the example DSL instructions generator 616 implements and/or includes the MLP 526 to generate an encoded representation of the feature maps. In some examples, the DSL statement generator 624 of the example DSL instructions generator 616 implements and/or includes the second RNN 506 to generate DSL commands as outlined above. In some examples, the positional inference generator 626 of the example DSL instructions generator 616 implements and/or includes the STNs 530, 532 and the associated MLPs 534, 536 to generate the position information (e.g., the positional property values) associated with the DSL commands generated by the DSL statement generator 624. In some examples, the DSL statement generator 624 combines the DSL commands with the positional property values to form the complete DSL statements output after each iteration of the second RNN 506. The DSL statements may then be used by the example rendering tool 620 to generate a new rendered image used in the next iteration of the process.

The example computing device 600 of FIG. 6 includes the example style generator 628 to execute the AI models and other data processing associated with the style generation stage 214 of FIG. 2. More particularly, in some examples, the global style generator 630 of the example style generator 628 implements and/or includes the global style generator network described above to generate global style properties for all aspects of a particular GUI design. In some examples, the local style generator 632 of the example style generator 628 implements and/or includes the local style generator network described above to generate local style properties for a particular element of a GUI design based on the particular DSL statement associated with the element as well as additional parameter values. In some examples, the example DSL statement analyzer 634 of the example style generator 628 analyzes different DSL statements generated by the DSL instructions generator to determine whether the visual elements need a style assigned to them and, if so, whether the style should be based on a global style, a local style, or a user-defined style.

The example computing device 600 of FIG. 6 includes the example translator 636 to translate the DSL instructions generated by the DSL instructions generator into a target programming language code and/or to translate the style properties into a target style language code.

The example computing device 600 of FIG. 6 includes the example compiler and/or interpreter 638 to compile and/or run the programming and style language codes generated by the example translator 636 to create full prototypes of the GUI designs defined by such code.

While an example manner of implementing the computing device 600 of FIG. 6 is illustrated in FIG. 6, one or more of the elements, processes and/or devices illustrated in FIG. 6 may be combined, divided, re-arranged, omitted, eliminated and/or implemented in any other way. Further, the example communications interface 602, the example user interface 604, the example camera 606, the example image processor 608, the example microphone 610, the example speech analyzer 612, the example memory 614, the example DSL instructions generator 616 (including the example textual description analyzer 618, the example rendering tool 620, the example image analyzer 622, the example DSL statement generator 624, and the example positional inference generator 626), the example style generator 628 (including the example global style generator 630, the example local style generator 632, and the example DSL statement analyzer 634), the example translator 636, the example compiler and/or interpreter 638 and/or, more generally, the example computing device 600 of FIG. 6 may be implemented by hardware, software, firmware and/or any combination of hardware, software and/or firmware. Thus, for example, any of the example communications interface 602, the example user interface 604, the example camera 606, the example image processor 608, the example microphone 610, the example speech analyzer 612, the example memory 614, the example DSL instructions generator 616 (including the example textual description analyzer 618, the example rendering tool 620, the example image analyzer 622, the example DSL statement generator 624, and the example positional inference generator 626), the example style generator 628 (including the example global style generator 630, the example local style generator 632, and the example DSL statement analyzer 634), the example translator 636, the example compiler and/or interpreter 638 and/or, more generally, the example computing device 600 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communications interface 602, the example user interface 604, the example camera 606, the example image processor 608, the example microphone 610, the example speech analyzer 612, the example memory 614, the example DSL instructions generator 616 (including the example textual description analyzer 618, the example rendering tool 620, the example image analyzer 622, the example DSL statement generator 624, and the example positional inference generator 626), the example style generator 628 (including the example global style generator 630, the example local style generator 632, and the example DSL statement analyzer 634), the example translator 636, and/or the example compiler and/or interpreter 638 is/are hereby expressly defined to include a non-transitory computer readable storage device or storage disk such as a memory, a digital versatile disk (DVD), a compact disk (CD), a Blu-ray disk, etc. including the software and/or firmware. Further still, the example computing device 600 of FIG. 6 may include one or more elements, processes and/or devices in addition to, or instead of, those illustrated in FIG. 6, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 7:
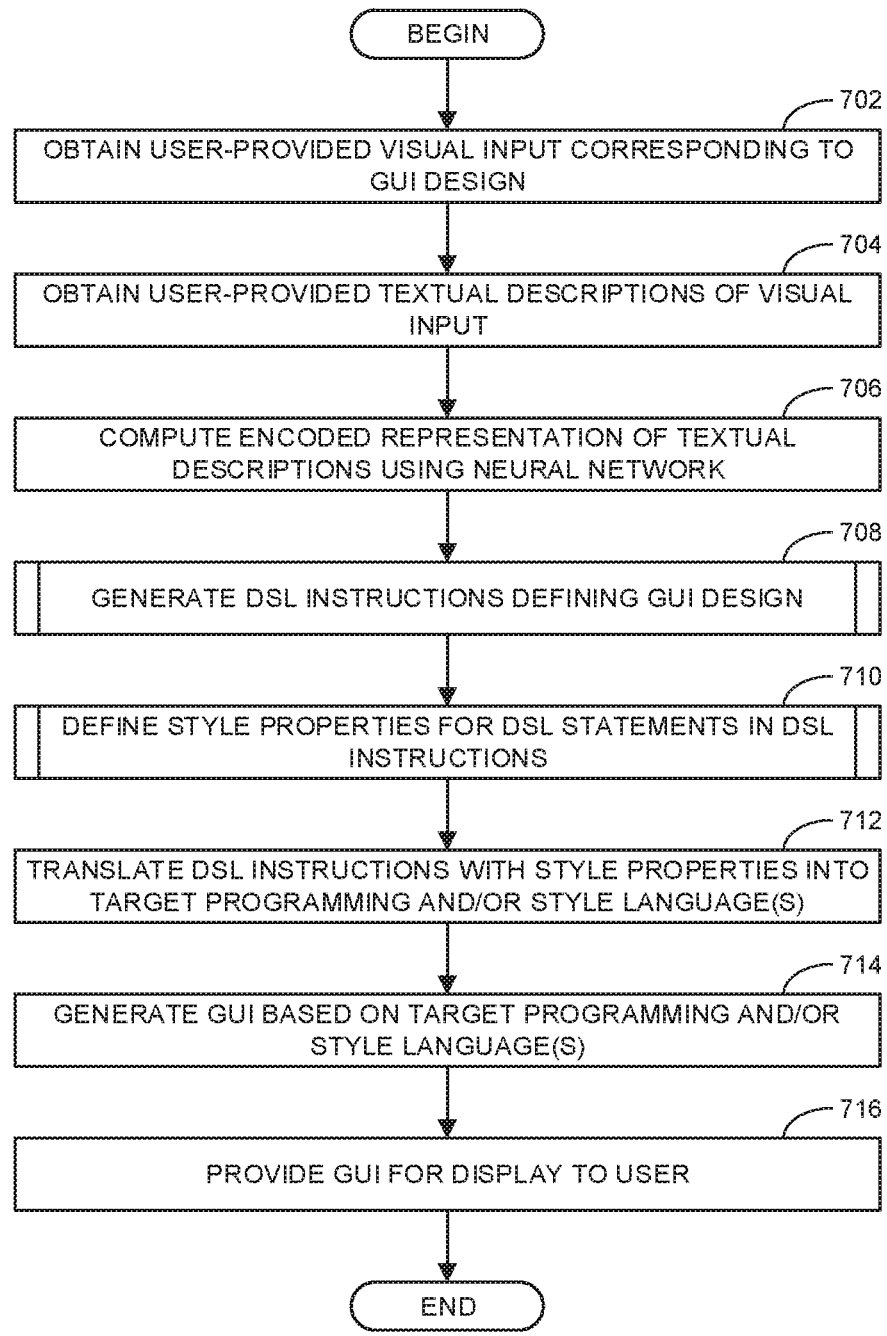
FIG. 7 is a flowchart representative of machine readable instructions which may be executed to implement the example computing device of FIG. 6.
Figure 8:
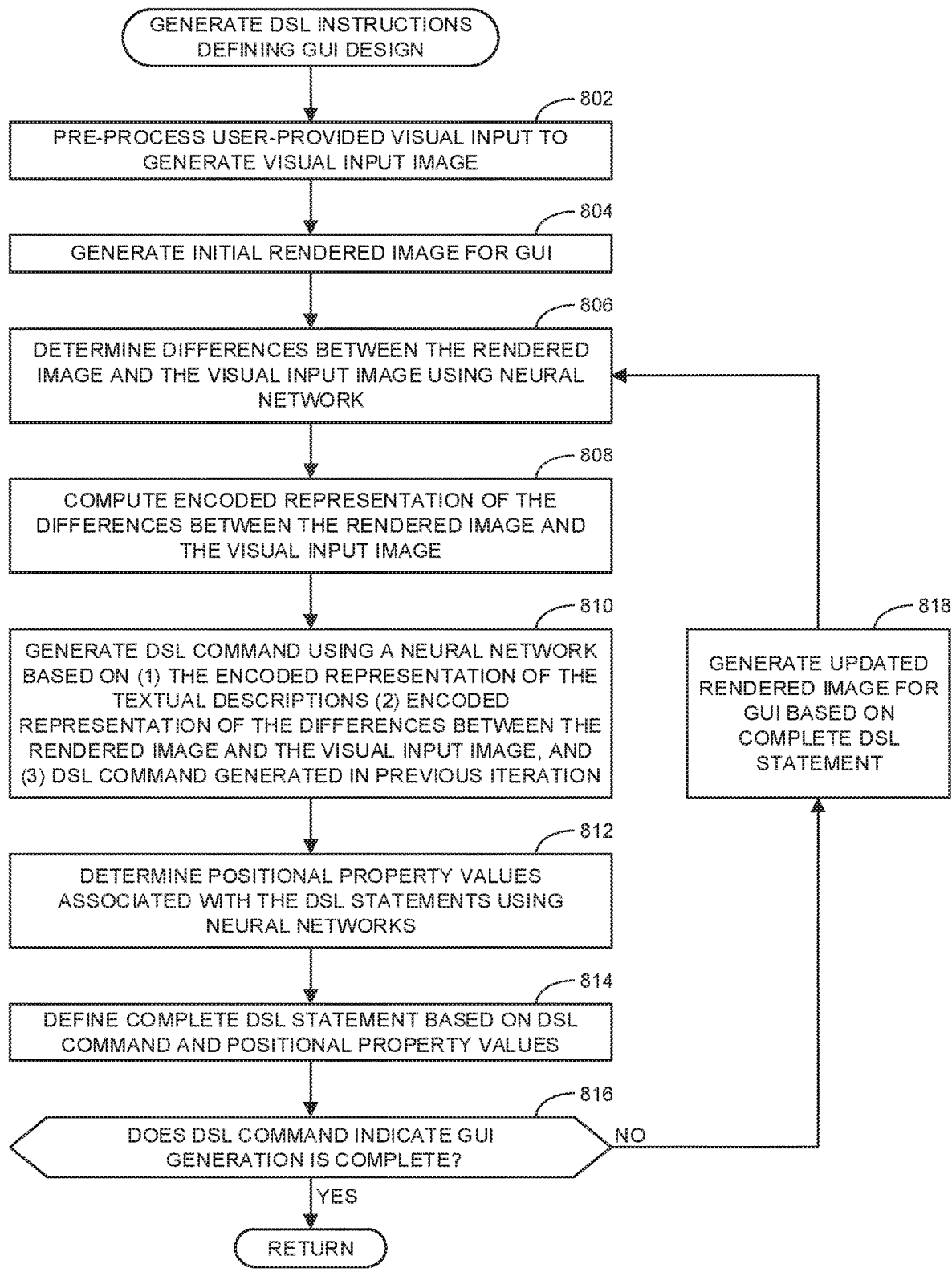
FIG. 8 is a flowchart representative of machine readable instructions which may be executed to implement block 708 of FIG. 7.
Figure 9:
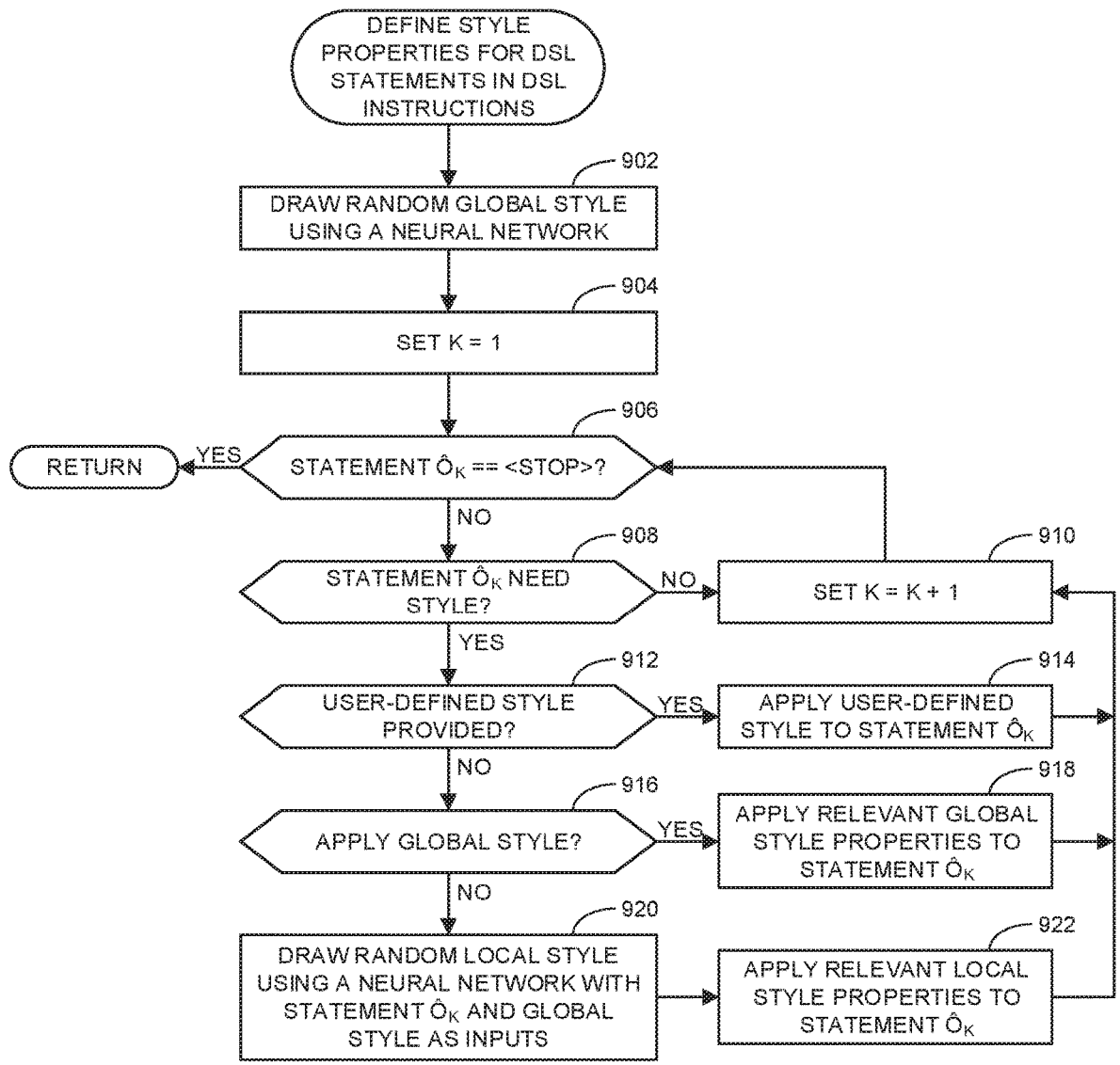
FIG. 9 is a flowchart representative of machine readable instructions which may be executed to implement block 710 of FIG. 7.

Flowcharts representative of example hardware logic, machine readable instructions, hardware implemented state machines, and/or any combination thereof for implementing the computing device 600 of FIG. 6 are shown in FIG. 7-9. The machine readable instructions may be one or more executable programs or portion(s) of an executable program for execution by a computer processor such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIG. 7-9, many other methods of implementing the example computing device 600 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 7-9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The program of FIG. 7 begins at block 702 where the example computing device 600 obtains user-provided visual input corresponding to a GUI design. At block 704, the example computing device 600 obtains user-provided textual descriptions of the visual input. The visual input and the associated textual descriptions may be obtained in any suitable mechanism. For example, the visual input may be a hand drawn sketch that is scanned by a scanner or captured in an image by a camera. Additionally or alternatively, the visual input may be created directly on the computing device (e.g., using any suitable drawing program).

At block 706, the example DSL instructions generator 616 computes an encoded representation of the textual descriptions using a neural network. More particularly, in some examples, the textual description analyzer 618 implements an RNN (e.g., the first RNN 502 represented in FIG. 5) to generate the encoded representation of the textual descriptions. At block 708, the example DSL instructions generator 616 generates DSL instructions (e.g., the DSL instructions 212 of FIGS. 2 and/or 5) defining the GUI design. Further detail regarding the implementation of block 708 is provided below in connection with FIG. 8.

At block 710, the example style generator 628 defines style properties for DSL statements in the DSL instructions. Further detail regarding the implementation of block 710 is provided below in connection with FIG. 9. At block 712, the example translator 636 translates the DSL instructions with the style properties into target programming and/or style language(s) At block 714, the example compiler and/or interpreter 638 generates a GUI based on the targeting programming and/or style language(s). At block 716, the example user interface 604 provides the GUI for display to the user. Thereafter, the example process of FIG. 7 ends.

As mentioned above, FIG. 8 is an example implementation of block 708 of FIG. 7. The example process of FIG. 8 begins at block 802 where the example image processor 608 pre-processes the user-provided visual input to generate a visual input image. At block 804, the example DSL instructions generator 616 generates an initial rendered image for the GUI. More particularly, in some examples, the rendering tool 620 generates the initial rendered image. In some examples, the initial rendered image is a blank image that has been previously defined and stored in the example memory 614.

At block 806, the example DSL instructions generator 616 determines difference between the rendered image and the visual input image using a neural network. More particularly, in some examples, the image analyzer 622 implements a CNN (e.g., the CNN 514 represented in FIG. 5) to generate a features maps indicative of the differences between the images. Thereafter, at block 808, the example DSL instructions generator 616 computes an encoded representation of the difference between the rendered image and the visual input image. More particularly, in some examples, the image analyzer 622 implements an MLP (e.g., the MLP 526 represented in FIG. 5) to generate the encoded representation of the differences between the images.

At block 810, the example DSL instructions generator 616 generates a DSL command using a neural network based on (1) the encoded representation of the textual descriptions (generated at block 708 of FIG. 7), (2) the encoded representation of the differences between the rendered image and the visual input image, and (3) a DSL command generated in a previous iteration of the process. More particularly, in some examples, the DSL statement generator 624 implements an RNN (e.g., the second RNN 506 represented in FIG. 5) to generate the DSL command as outlined above. At block 812, the example DSL instructions generator 616 determines positional property values associated with the DSL command using neural networks. More particularly, in some examples, the positional inference generator 626 implements a series of STNs (e.g., the STNs 530, 532 represented in FIG. 5) and an associated series of MLPs (e.g., the MLPs 534, 536 represented in FIG. 5) to determine the positional property values. Thereafter, at block 814, the example DSL instructions generator 616 defines a complete DSL statement based on the DSL command and the positional property values. More particularly, in some examples, the DSL statement generator 624 defines the complete DSL statement based on the DSL command and the positional property values.

At block 816, the example DSL instructions generator 616 determines whether the DSL command indicates the GUI generation is complete. If not, control advances to block 818 where the example DSL instructions generator 616 generates an updated rendered image for the GUI based on the complete DSL statement. More particularly, in some examples, the rendering tool 620 generates a new rendered image based on the DSL statement. Thereafter, control returns to block 806. If the DSL command indicates the GUI generation is complete (block 816), the example process of FIG. 8 ends and returns to complete the example process of FIG. 7.

As mentioned above, FIG. 9 is an example implementation of block 710 of FIG. 7. The example process of FIG. 9 begins at block 902 where the example style generator 628 draws a random global style using a neural network. More particularly, in some examples, the global style generator 630 implements a global style generator network of a GAN to randomly draw a global style for the GUI design. At block 904, the example style generator 628 sets k=1. In this example, k is an index or counter to control progression through the analysis of all DSL statements generated by the example DSL instructions generator 616.

At block 906, the example style generator 628 determines whether statement $ô_k$=<STOP>. If so, the example process of FIG. 9 ends and returns to complete the process of FIG. 7. Otherwise, control advances to block 908 where the example style generator 628 determines (e.g., via the DSL statement analyzer 634) whether statement $ô_k$ need style. If not, control advances to block 910 where the example style generator 628 sets k=k+1. Thereafter, control returns to block 906. Returning to block 908, if the DSL statement analyzer 634 determines that statement $ô_k$ needs style, control advances to block 912.

At block 912, the example style generator 628 determines (e.g., via the DSL statement analyzer 634) whether a user-defined style has been provided. If so, control advances to block 914, where the example DSL statement analyzer 634 applies the user-defined style to statement $ô_k$. Thereafter, control advances to block 910 to increment k as described above. If not user-defined style is provided (block 912), control advances to block 916 where the example style generator 628 determines (e.g., via the DSL statement analyzer 634) whether to apply a global style. If so, control advances to block 918, where the example DSL statement analyzer 634 applies the relevant global style properties to statement $ô_k$. Thereafter, control advances to block 910 to increment k as described above.

If a global style is not to apply (block 916), control advances to block 920 where the example style generator 628 draws a random local style using a neural network with the statement $ô_k$ and the global style as inputs. In some examples, different parameters may be used as inputs in addition to or instead of the global style. More particularly, in some examples, the local style generator 632 implements a local style generator network of a GAN to randomly draw a local style for the GUI design that is constrained or conditioned by the inputs to the local style generator network. Thereafter, at block 922, the example DSL statement analyzer 634 applies the relevant local style properties to statement $ô_k$. Thereafter, control advances to block 910 to increment k as described above and the process continues to repeat until statement $ô_k$=<STOP> as noted above.

Figure 10:
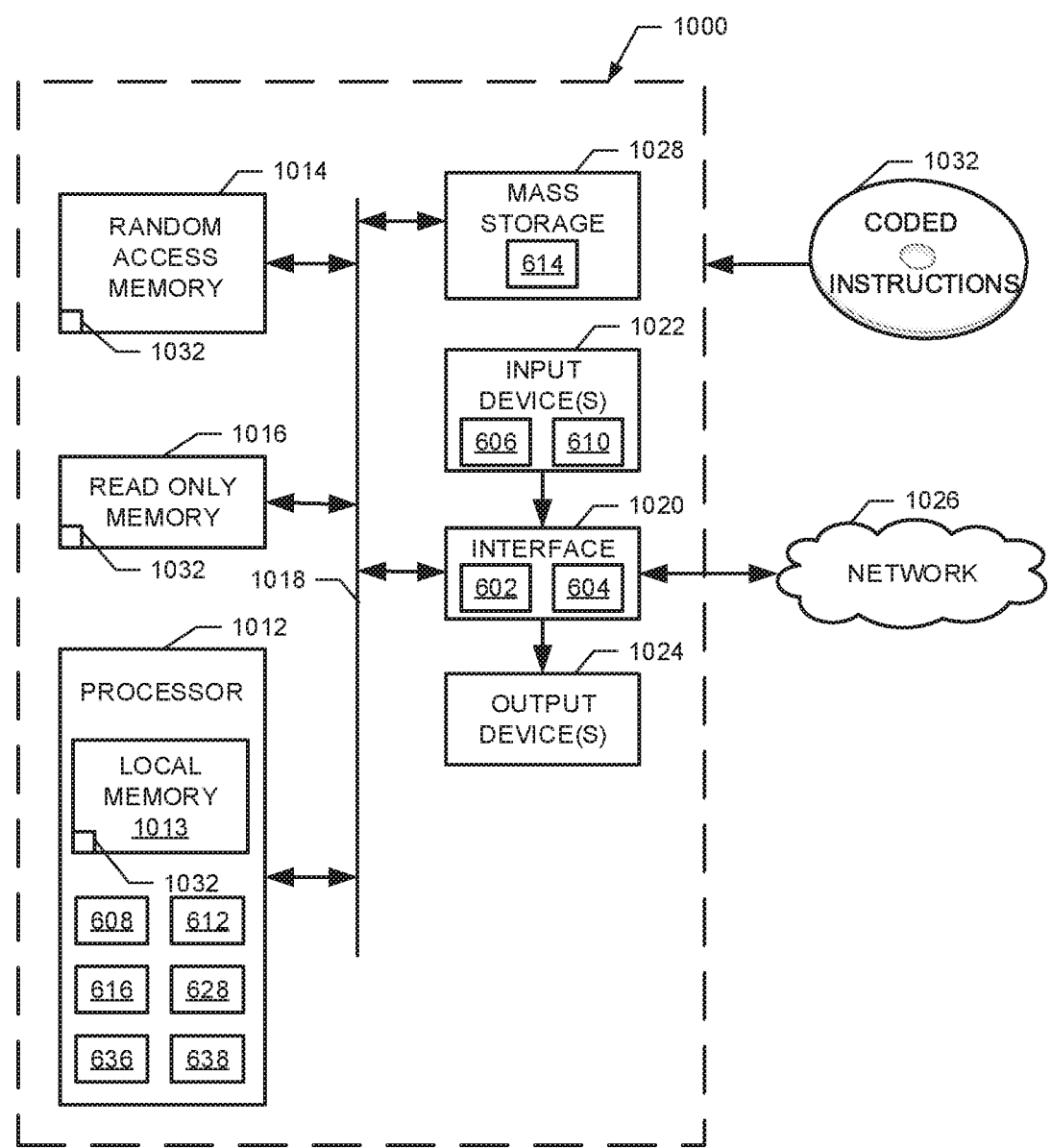
FIG. 10 is a block diagram of an example processing platform structured to execute the instructions of FIG. 7-9 to implement the example computing device of FIG. 6.

FIG. 10 is a block diagram of an example processor platform 1000 structured to execute the instructions of FIGS. 7-9 to implement the example computing device 600 of FIG. 6. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example image processor 608, the example speech analyzer 612, the example DSL instructions generator 616 (including the example textual description analyzer 618, the example rendering tool 620, the example image analyzer 622, the example DSL statement generator 624, and the example positional inference generator 626), the example style generator 628 (including the example global style generator 630, the example local style generator 632, and the example DSL statement analyzer 634), the example translator 636, and/or the example compiler and/or interpreter 638.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface. In this example, the interface 1020 includes the example communications interface 602, and the example user interface 604.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system. In this example, the inputs device(s) include the example camera 606 and the example microphone 610.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives. In this example, the mass storage device implements the example memory 614.

The machine executable instructions 1032 of FIGS. 7-9 may be stored in the mass storage device 1028, in the volatile memory 1014, in the non-volatile memory 1016, and/or on a removable non-transitory computer readable storage medium such as a CD or DVD.

From the foregoing, it will be appreciated that example methods, apparatus and articles of manufacture have been disclosed that employ AI processes to automatically generate mockups of GUI design with little to now human involvement beyond providing initial concepts and requirements via hand drawn sketches (or other visual inputs) and textual descriptions of the visual inputs. Further, example mockups may include automatically generated styles incorporated into the various visual elements in the mockups. The typical time-to-design from initial concepts to a GUI mockup can take hours or days. By contrast, example mockups generated in accordance with teachings disclosed herein are generated in substantially real-time (e.g., within seconds), thereby significantly increasing the efficiency of users in developing GUIs and enabling the rapid iteration through multiple design ideas. Further, in some examples, multiple different GUI designs may be automatically generated (e.g., based on variations in the style properties) to be provided to a user for selection. Further, the example mockups are generated or rendered based on underlying DSL instructions (e.g., executable code or script) that can be directly translated to any suitable programming language for subsequent integration with user diagram flows to form working prototypes.

Example methods, apparatus, systems, and articles of manufacture to automatically generate instructions (e.g., executable code or script) for graphical user interfaces are disclosed herein. Further examples and combinations thereof include the following:

Example 1 includes an apparatus comprising a textual description analyzer to encode a user-provided textual description of a GUI design with a first neural network, a DSL statement generator to generate a DSL statement with a second neural network, the DSL statement to define a visual element of the GUI design, the DSL statement generated based on at least one of the encoded textual description or a user-provided image representative of the GUI design, and a rendering tool to render a mockup of the GUI design based on the DSL statement.

Example 2 includes the apparatus of example 1, wherein the user-provided image is a hand drawn sketch.

Example 3 includes the apparatus of any one of examples 1 or 2, wherein the first neural network is a recurrent neural network.

Example 4 includes the apparatus of any one of examples 1-3, further including an image analyzer to determine a difference between the user-provided image and a rendered image with a third neural network, the rendered image corresponding to an approximation of the GUI design, the DSL statement generator to generate the DSL statement based on the difference.

Example 5 includes the apparatus of example 4, wherein the third neural network is a convolutional neural network.

Example 6 includes the apparatus of any one of examples 4 or 5, wherein the image analyzer is to generate an encoded representation of the difference with a fourth neural network, the DSL statement generator to generate the DSL statement based on the encoded representation of the difference.

Example 7 includes the apparatus of example 6, wherein the fourth neural network is a multilayer perceptron neural network.

Example 8 includes the apparatus of any one of examples 4-7, wherein the difference are first difference is a first difference, the DSL statement is a first DSL statement, and the rendered image is a first rendered image, the rendering tool to generate a second rendered image based on the DSL statement, the image analyzer to determine a second difference between the user-provided image and the second rendered image with the third neural network, the DSL statement generator to generate a second DSL statement based on the second difference.

Example 9 includes the apparatus of any one of examples 1-8, wherein the DSL statement generator is to generate a DSL command with the second neural network, the DSL command to define the visual element, the apparatus further including a positional inference generator to determine a value of a positional property for the visual element with a spatial transformer network, the DSL statement generator to generate the DSL statement by associating the value of the positional property with the DSL command.

Example 10 includes the apparatus of example 9, wherein the second neural network is a recurrent neural network, the DSL statement generator to generate different DSL commands at each iteration of the recurrent neural network, a first DSL command generated in a first iteration to be provided as an input to the recurrent neural network to generate a second DSL command at a second iteration following the first iteration.

Example 11 includes the apparatus of any one of examples 1-10, further including a style generator to automatically generate a style property for the visual element of the GUI design with a neural network, the rendering tool to render the mockup based on the style property.

Example 12 includes the apparatus of example 11, wherein the neural network is associated with a generative adversarial network.

Example 13 includes the apparatus of any one of examples 11 or 12, wherein the neural network is a global style generator network and the style property is a global style property, the global style property to define a property applicable to multiple visual elements of the GUI design.

Example 14 includes the apparatus of example 13, wherein the style generator includes a local style generator to automatically generate a local style property for at least one of the visual elements, the local style property based on at least one of (1) the DSL statement corresponding to the at least one of the visual elements, (2) a value of the global style property, or (3) a user-provided value.

Example 15 includes a non-transitory computer readable medium comprising instructions that, when executed, cause a machine to at least encode a user-provided textual description of a GUI design with a first neural network, generate a DSL statement with a second neural network, the DSL statement to define a visual element of the GUI design, the DSL statement generated based on at least one of the encoded textual description or a user-provided image representative of the GUI design, and render a mockup of the GUI design based on the DSL statement.

Example 16 includes the non-transitory computer readable medium of example 15, wherein the user-provided image is from a hand drawn sketch.

Example 17 includes the non-transitory computer readable medium of any one of examples 15 or 16, wherein the first neural network is a recurrent neural network.

Example 18 includes the non-transitory computer readable medium of any one of examples 15-17, wherein the instructions further cause the machine to determine a difference between the user-provided image and a rendered image with a third neural network, the rendered image corresponding to an approximation of the GUI design, and generate the DSL statement based on the difference.

Example 19 includes the non-transitory computer readable medium of example 18, wherein the third neural network is a convolutional neural network.

Example 20 includes the non-transitory computer readable medium of any one of examples 18 or 19, wherein the instructions further cause the machine to generate an encoded representation of the difference with a fourth neural network, and generate the DSL statement based on the encoded representation of the difference.

Example 21 includes the non-transitory computer readable medium of example 20, wherein the fourth neural network is a multilayer perceptron neural network.

Example 22 includes the non-transitory computer readable medium of any one of examples 18-21, wherein the difference is a first difference, the DSL statement is a first DSL statement, and the rendered image is a first rendered image, the instructions to further cause the machine to generate a second rendered image based on the DSL statement, determine a second difference between the user-provided image and the second rendered image with the third neural network, and generate a second DSL statement based on the second difference.

Example 23 includes the non-transitory computer readable medium of any one of examples 15-22, wherein the instructions further cause the machine to generate a DSL command with the second neural network, the DSL command to define the visual element, determine a value of positional property for the visual element with a spatial transformer network, and associate the value of the positional property with the DSL command.

Example 24 includes the non-transitory computer readable medium of example 23, wherein the second neural network is a recurrent neural network, the instructions to further cause the machine to generate different DSL commands at each iteration of the recurrent neural network, a first DSL command generated in a first iteration to be provided as an input to the recurrent neural network to generate a second DSL command at a second iteration following the first iteration.

Example 25 includes the non-transitory computer readable medium of example 15, wherein the instructions further cause the machine to automatically generate a style property for the visual element of the GUI design with a neural network, and render the mockup based on the style property.

Example 26 includes the non-transitory computer readable medium of example 25, wherein the neural network is associated with a generative adversarial network.

Example 27 includes the non-transitory computer readable medium of any one of examples 25 or 26, wherein the neural network is a global style generator network and the style property is a global style property, the global style property to define a property applicable to multiple visual elements of the GUI design.

Example 28 includes the non-transitory computer readable medium of example 27, wherein the instructions further cause the machine to automatically generate a local style property for at least one of the visual elements with a local style generator network, the local style property based on at least one of (1) the DSL statement corresponding to the at least one of the visual elements, (2) a value of the global style property, or (3) a user-provided value.

Example 29 includes a method comprising encoding a user-provided textual description of a GUI design with a first neural network, generating a DSL statement with a second neural network, the DSL statement to define a visual element of the GUI design, the DSL statement generated based on at least one of the encoded textual description or a user-provided image representative of the GUI design, and rendering a mockup of the GUI design based on the DSL statement.

Example 30 includes the method of example 29, wherein the user-provided image is from a hand drawn sketch.

Example 31 includes the method of any one of examples 29 or 30, wherein the first neural network is a recurrent neural network.

Example 32 includes the method of any one of examples 29-31, further including determining a difference between the user-provided image and a rendered image with a third neural network, the rendered image corresponding to an approximation of the GUI design, and generating the DSL statement based on the difference.

Example 33 includes the method of example 32, wherein the third neural network is a convolutional neural network.

Example 34 includes the method of any one of examples 32 or 32, further including generating an encoded representation of the difference with a fourth neural network, and generating the DSL statement based on the encoded representation of the difference.

Example 35 includes the method of example 34, wherein the fourth neural network is a multilayer perceptron neural network.

Example 36 includes the method of any one of examples 32-35, wherein the difference are first difference is a first difference, the DSL statement is a first DSL statement, and the rendered image is a first rendered image, the method further including generating a second rendered image based on the DSL statement, determining a second difference between the user-provided image and the second rendered image with the third neural network, and generating a second DSL statement based on the second difference.

Example 37 includes the method of any one of examples 29-36, wherein the generating of the DSL statement includes generating a DSL command with the second neural network, the DSL command to define the visual element, determining a value of positional property for the visual element with a spatial transformer network, and associating the value of the positional property with the DSL command.

Example 38 includes the method of example 37, wherein the second neural network is a recurrent neural network, the method further including generating different DSL commands at each iteration of the recurrent neural network, a first DSL command generated in a first iteration to be provided as an input to the recurrent neural network to generate a second DSL command at a second iteration following the first iteration.

Example 39 includes the method of any one of examples 29-38, further including automatically generating a style property for the visual element of the GUI design with a neural network, and rendering the mockup based on the style property.

Example 40 includes the method of example 39, wherein the neural network is a generator network is associated with a generative adversarial network.

Example 41 includes the method of any one of examples 39 or 40, wherein the neural network is a global style generator network and the style property is a global style property, the global style property to define a property applicable to multiple visual elements of the GUI design.

Example 42 includes the method of example 41, further including automatically generating a local style property for at least one of the visual elements with a local style generator network, the local style property based on at least one of (1) the DSL statement corresponding to the at least one of the visual elements, (2) a value of the global style property, or (3) a user-provided value.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
a textual description analyzer to encode a user-provided textual description of a graphical user interface (GUI) design with a first neural network;
a domain specific language (DSL) statement generator to generate a DSL statement with a second neural network, the DSL statement to define a first visual element of the GUI design, the DSL statement generated based on at least one of the encoded textual description of the GUI design or a user-provided image representative of the GUI design;
a style generator to automatically generate a style property for the first visual element of the GUI design with a third neural network, wherein the third neural network is a global style generator network and the style property is a global style property, the global style property to define a property applicable to multiple visual elements of the GUI design including the first visual element; and
a rendering tool to render a mockup of the GUI design based on the DSL statement and the style property.

2. The apparatus of claim 1, wherein the user-provided image is a hand drawn sketch.

3. The apparatus of claim 1, wherein the first neural network is a recurrent neural network.

4. The apparatus of claim 1, further including an image analyzer to determine a difference between the user-provided image and a rendered image with a fourth neural network, the rendered image corresponding to an approximation of the GUI design, the DSL statement generator to generate the DSL statement based on the difference.

5. The apparatus of claim 4, wherein the fourth neural network is a convolutional neural network.

6. The apparatus of claim 4, wherein the image analyzer is to generate an encoded representation of the difference with a fifth neural network, the DSL statement generator to generate the DSL statement based on the encoded representation of the difference.

7. The apparatus of claim 6, wherein the fifth neural network is a multilayer perceptron neural network.

8. The apparatus of claim 4, wherein the difference is a first difference, the DSL statement is a first DSL statement, and the rendered image is a first rendered image, the rendering tool to generate a second rendered image based on the DSL statement, the image analyzer to determine a second difference between the user-provided image and the second rendered image with the fourth neural network, the DSL statement generator to generate a second DSL statement based on the second difference.

9. The apparatus of claim 1, wherein the DSL statement generator is to generate a DSL command with the second neural network, the DSL command to define the first visual element, the apparatus further including a positional inference generator to determine a value of a positional property for the first visual element with a spatial transformer network, the DSL statement generator to generate the DSL statement by associating the value of the positional property with the DSL command.

10. The apparatus of claim 1, wherein the third neural network is associated with a generative adversarial network.

11. The apparatus of claim 1, wherein the style generator includes a local style generator to automatically generate a local style property for at least one of the multiple visual elements, the local style property based on at least one of (1) the DSL statement corresponding to the at least one of the multiple visual elements, (2) a value of the global style property, or (3) a user-provided value.

12. An apparatus comprising:
a textual description analyzer to encode a user-provided textual description of a graphical user interface (GUI) design with a first neural network;
a positional inference generator to determine, with a spatial transformer network, a value of a positional property for a visual element of the GUI design;
a domain specific language (DSL) statement generator to:
generate different DSL commands at each iteration of a recurrent neural network, ones of the different DSL commands to define the visual element, a first DSL command generated in a first iteration to be provided as an input to the recurrent neural network to generate a second DSL command at a second iteration following the first iteration;
generate, with the recurrent neural network, a DSL statement by associating a value of a positional property with the ones of the different DSL commands, the DSL statement generated based on at least one of the encoded textual description of the GUI design or a user-provided image representative of the GUI design; and a rendering tool to render a mockup of the GUI design based on the DSL statement.

13. A non-transitory computer readable medium comprising instructions that, when executed, cause a machine to at least:
encode a user-provided textual description of a GUI design with a first neural network;
generate a DSL statement with a second neural network, the DSL statement to define a first visual element of the GUI design, the DSL statement generated based on at least one of the encoded textual description of the GUI design or a user-provided image representative of the GUI design;
generate a style property for the first visual element of the GUI design with a third neural network, wherein the third neural network is a global style generator network and the style property is a global style property, the global style property to define a property applicable to multiple visual elements of the GUI design including the first visual element; and
render a mockup of the GUI design based on the DSL statement and the style property.

14. The non-transitory computer readable medium of claim 13, wherein the instructions further cause the machine to:

determine a difference between the user-provided image and a rendered image with a fourth neural network, the rendered image corresponding to an approximation of the GUI design; and generate the DSL statement based on the difference.

15. The non-transitory computer readable medium of claim 14, wherein the difference is a first difference, the DSL statement is a first DSL statement, and the rendered image is a first rendered image, the instructions to further cause the machine to:

generate a second rendered image based on the DSL statement;

determine a second difference between the user-provided image and the second rendered image with the fourth neural network; and generate a second DSL statement based on the second difference.

16. The non-transitory computer readable medium of claim 14, wherein the instructions further cause the machine to:

generate an encoded representation of the difference with a fifth neural network; and generate the DSL statement based on the encoded representation of the difference.

17. The non-transitory computer readable medium of claim 16, wherein the fifth neural network is a multilayer perceptron neural network.

18. The non-transitory computer readable medium of claim 14, wherein the fourth neural network is a convolutional neural network.

19. The non-transitory computer readable medium of claim 13, wherein the instructions further cause the machine to:

generate a DSL command with the second neural network, the DSL command to define the first visual element;

determine a value of positional property for the first visual element with a spatial transformer network; and associate the value of the positional property with the DSL command.

20. The non-transitory computer readable medium of claim 19, wherein the second neural network is a recurrent neural network, the instructions to further cause the machine to generate different DSL commands at each iteration of the recurrent neural network, a first DSL command generated in a first iteration to be provided as an input to the recurrent neural network to generate a second DSL command at a second iteration following the first iteration.

21. The non-transitory computer readable medium of claim 13, wherein the instructions further cause the machine to automatically generate a local style property for at least one of the multiple visual elements with a local style generator network, the local style property based on at least one of (1) the DSL statement corresponding to the at least one of the multiple visual elements, (2) a value of the global style property, or (3) a user-provided value.

22. The non-transitory computer readable medium of claim 13, wherein the user-provided image is from a hand drawn sketch.

23. The non-transitory computer readable medium of claim 13, wherein the first neural network is a recurrent neural network.

24. The non-transitory computer readable medium of claim 13, wherein the third neural network is associated with a generative adversarial network.

25. A method comprising:

encoding a user-provided textual description of a GUI design with a first neural network;

generating a DSL statement with a second neural network, the DSL statement to define a first visual element of the GUI design, the DSL statement generated based on at least one of the encoded textual description of the GUI design or a user-provided image representative of the GUI design;

generating a style property for the first visual element of the GUI design with a third neural network, wherein the third neural network is a global style generator network and the style property is a global style property, the global style property to define a property applicable to multiple visual elements of the GUI design including the first visual element; and rendering a mockup of the GUI design based on the DSL statement and the style property.

26. The method of claim 25, further including:

determining a difference between the user-provided image and a rendered image with a fourth neural network, the rendered image corresponding to an approximation of the GUI design; and generating the DSL statement based on the difference.

27. The method of claim 26, wherein the difference is a first difference, the DSL statement is a first DSL statement, and the rendered image is a first rendered image, the method further including:

generating a second rendered image based on the DSL statement;

determining a second difference between the user-provided image and the second rendered image with the fourth neural network; and generating a second DSL statement based on the second difference.

28. The method of claim 26, further including:

generating an encoded representation of the difference with a fourth neural network; and generating the DSL statement based on the encoded representation of the difference.

29. The method of claim 25, wherein the generating of the DSL statement includes:

generating a DSL command with the second neural network, the DSL command to define the first visual element;

determining a value of positional property for the first visual element with a spatial transformer network; and associating the value of the positional property with the DSL command.

30. The method of claim 29, wherein the second neural network is a recurrent neural network, the method further including generating different DSL commands at each iteration of the recurrent neural network, a first DSL command generated in a first iteration to be provided as an input to the recurrent neural network to generate a second DSL command at a second iteration following the first iteration.

31. The method of claim 25, further including:

automatically generating a global style property to define a property applicable to multiple visual elements of the GUI design with a fourth neural network, wherein the fourth neural network is a global style generator network;

automatically generating a local style property for at least one of the visual elements with a local style generator network, the local style property based on a least one of (1) the DSL statement corresponding to the at least one of the visual elements, (2) a value of the global style property, or (3) a user-provided value; and rendering the mockup based on the local style property.

\* \* \* \* \*